(12) United States Patent
Rumbak et al.

(10) Patent No.: US 11,565,476 B2
(45) Date of Patent: Jan. 31, 2023

(54) APPARATUS AND METHODS FOR ADDITIVE MANUFACTURING OF THREE DIMENSIONAL OBJECTS

(71) Applicant: Stratasys Ltd., Rehovot (IL)

(72) Inventors: Mayan Rumbak, Mazkeret Batia (IL); Eduardo Napadensky, Natania (IL); Raffy Sarfati, Kibbutz Mishmar David (IL); Gavish Mida, Kibbutz Lehavot Haviva (IL)

(73) Assignee: Stratasys Ltd., Rehovot (IL)

( * ) Notice: Subject to any disclaimer, the term of this patent is extended or adjusted under 35 U.S.C. 154(b) by 0 days.

(21) Appl. No.: 16/914,572

(22) Filed: Jun. 29, 2020

(65) Prior Publication Data
US 2020/0324488 A1    Oct. 15, 2020

Related U.S. Application Data

(63) Continuation of application No. PCT/IL2018/051399, filed on Dec. 27, 2018.
(Continued)

(51) Int. Cl.
*B29C 64/393* (2017.01)
*B33Y 10/00* (2015.01)
(Continued)

(52) U.S. Cl.
CPC .......... *B29C 64/393* (2017.08); *B29C 64/112* (2017.08); *B29C 64/188* (2017.08);
(Continued)

(58) Field of Classification Search
CPC ... B29C 64/112; B29C 64/188; B29C 64/209; B29C 64/393; B29C 64/106;
(Continued)

(56) References Cited

U.S. PATENT DOCUMENTS

| | | | |
|---|---|---|---|
| 6,259,962 B1 * | 7/2001 | Gothait | B33Y 40/00 700/119 |
| 2005/0104241 A1 | 5/2005 | Kritchman et al. | |

(Continued)

FOREIGN PATENT DOCUMENTS

| | | |
|---|---|---|
| EP | 3222411 | 9/2017 |
| WO | WO 2019/130308 | 7/2019 |

OTHER PUBLICATIONS

Communication pursuant to Rule 114(2) EPC, Third Party Observation dated May 19, 2021 From the European Patent Office Re. Application No. 18836533.2. (15 Pages).
(Continued)

*Primary Examiner* — Philip C Tucker
*Assistant Examiner* — Evan T Hulting

(57) ABSTRACT

A method of additive manufacturing a three-dimensional object by layerwise deposition of a building material with an inkjet printing system comprising a print head and a building tray, comprises calculating a weighting value for each nozzle, then for each layer obtaining a 2-D map of the layer, comprising active pixels at building material dispensing positions; obtaining a Data Correction Filter (DCF) including a height map of the previous layer, comparing the data of the 2D map to the data of the DCF at each position and determining if the nozzle at that position should dispense, then printing the layer, updating the weighting values and adjusting the position of the print head vis a vis the printing tray. The above is repeated until the three-dimensional object is printed.

11 Claims, 18 Drawing Sheets

Related U.S. Application Data

(60) Provisional application No. 62/611,555, filed on Dec. 29, 2017.

(51) Int. Cl.
   *B33Y 50/02* (2015.01)
   *B29C 64/112* (2017.01)
   *B29C 64/188* (2017.01)
   *B29C 64/209* (2017.01)
   *B33Y 40/20* (2020.01)

(52) U.S. Cl.
   CPC ............ *B29C 64/209* (2017.08); *B33Y 10/00* (2014.12); *B33Y 40/20* (2020.01); *B33Y 50/02* (2014.12)

(58) Field of Classification Search
   CPC ....... B29C 64/00; B29C 64/386; B33Y 10/00; B33Y 40/20; B33Y 50/02; B33Y 40/00; B33Y 50/00
   See application file for complete search history.

(56) References Cited

U.S. PATENT DOCUMENTS

| | | |
|---|---|---|
| 2015/0165683 A1 | 6/2015 | Cheverton et al. |
| 2015/0174828 A1 | 6/2015 | Creuzer et al. |
| 2015/0273583 A1 | 10/2015 | Bumgardner |
| 2016/0023403 A1 | 1/2016 | Ramos et al. |
| 2016/0224017 A1 | 8/2016 | Huang et al. |
| 2017/0028646 A1 | 2/2017 | Sun |
| 2017/0253751 A1 | 9/2017 | Busbee et al. |

OTHER PUBLICATIONS

International Preliminary Report on Patentability dated Jul. 9, 2020 From the International Bureau of WIPO Re. Application No. PCT/IL2018/051399. (10 Pages).

International Search Report and the Written Opinion dated Apr. 23, 2019 From the International Searching Authority Re. Application No. PCT/IL2018/051399. (16 Pages).

Clijsters et al. "In Situ Quality Control of the Selective Laser Melting Process Using a High-Speed, Real-Time Melt Pool Monitoring System", The International Journal of Advanced Manufacturing Technology, XP055266002, 75(5-8): 1089-1101, Published Online Aug. 10, 2014.

Communication Pursuant to Article 94(3) EPC dated Aug. 9, 2021 From the European Patent Office Re. Application No. 18836533.2. (6 Pages).

Communication Pursuant to Article 94(3) EPC dated May 27, 2022 From the European Patent Office Re. Application No. 18836533.2. (5 Pages).

\* cited by examiner

APPARATUS AND METHODS FOR ADDITIVE MANUFACTURING OF THREE DIMENSIONAL OBJECTS

RELATED APPLICATIONS

This application is a Continuation of PCT Patent Application No. PCT/IL2018/051399 having International filing date of Dec. 27, 2018, which claims the benefit of priority under USC § 119(e) of U.S. Provisional Patent Application No. 62/611,555 filed on Dec. 29, 2017. The contents of the above applications are all incorporated by reference as if fully set forth herein in their entirety.

FIELD AND BACKGROUND OF THE INVENTION

The present invention, in some embodiments thereof, relates to a method and apparatus for minimizing the need for a roller in additive manufacturing or 3D printing, and more particularly but not exclusively, to ways of depositing a layer in additive manufacturing to provide a smooth layer of consistent thickness.

A method of three-dimensional fabrication of an object is disclosed in U.S. Pat. No. 8,784,723 to the present Assignee. The method comprises: forming layers in a pattern corresponding to the shape of the three-dimensional object, at least one layer of the plurality of layers being formed at a predetermined and different thickness selected so as to compensate for post-formation shrinkage of the layer along a vertical direction. Spread of the layer building material of one or more layers is diluted at least locally such as to maintain a predetermined thickness and a predetermined planar resolution for the layer.

A like issue is faced when increased resolution is needed. The increased resolution requires increased nozzle usage and can have the unintended consequence of increasing layer thickness, and dilution may be employed to compensate for the increased thickness and produce a smoother, more consistent result. As stated therein, dilution is particularly useful when it is desired to increase the resolution in the X direction. The spread of building material per unit area is therefore diminished so as to compensate for any increment in the layer's thickness which may occur as a result of the increased resolution. The dismissing can be done by diluting the spread of building material, by reducing the size of droplets, and the like.

The cited patent further discloses awareness of an additional problem, typically associated with types of printing apparatus which dispense building materials through nozzle arrays, and which relates to the formation of defective locations on the layer. This problem is addressed by increasing the amount of building material in regions of the subsequent layer which overlap the defective locations.

The citation teaches that the problems are solved by calculation in advance and building a printing bitmap based on the expected layer thickness as predicted by the nozzles in operation. Then a dilution ratio is calculated and a new bitmap is constructed by applying a dilution transformation based on modifying nozzle operation for the dilution ratio.

However, the modification is based on prior knowledge of the nozzles. If the nozzles do not work as predicted, say some nozzles have been damaged or blocked since the previous calibration, or ink pressure has changed or for any other reason, then the advance calculation may not be accurate, and a leveling device or planarizer (e.g. roller, scraper) must be relied upon to provide smoothness and/or desired thickness of the layer, with consequent raised levels of waste being generated.

Use of a roller for providing consistent smooth layers has a significant impact on printer cost, reliability and waste production. Minimizing the need for a roller or even eliminating its use would be useful and cost efficient.

SUMMARY OF THE INVENTION

The present embodiments may compensate for non-uniformity in the printed layer by measuring size of drops or droplets deposited from the individual nozzles and using the droplet size to provide an estimate of the non-uniformity. The printing may then be modified to compensate. The estimate may be made as a profile in the pre-print bit map.

Non-uniformities in the printed layers may be further be due to distribution and uneven size or layout of the printing nozzles in the print head, and these features may further be used to modify the pre-print bit map. Compensation may involve modifying which nozzles are switched on, and when.

Compensation may be carried out as above, that is based on nozzle data known in advance. Alternatively, compensation may be carried out based on measurements of actual printed layer thickness obtained by scanning during the printing process. Compensation may involve integrating the correction information into a filter referred to as a data correction filter (DCF).

In one embodiment, compensation is carried out initially based on nozzle data known in advance and then modified according to measurements taken in real time during the printing process.

It is noted that the compensation calculation carried out in advance may be based on drop size and operational data of individual nozzles. Real time modification may be based on actual layer thicknesses, as obtained by surface scanning and the like, and combining the two requires combining results of two different types of measurement.

The result may be a relatively flat layer at a known height, and thus there is less flattening work for the roller to do. Thus, considerable resources are saved, as the roller in prior art systems typically removes a large percentage of the material printed, leading to additional cost, excessive use of printing material, waste removal issues with the printer, and environmental concerns, as well as increasing the overall cost of the system and its maintenance.

According to an aspect of some embodiments of the present invention there is provided a method of additive manufacturing a three-dimensional object by layerwise deposition of a building material with an inkjet printing system comprising a print head and a building tray, the method comprising:

calculating a weighting value for each nozzle of the printhead, the weighting value corresponding to an amount of material being dispensed by each of the nozzles;

for each layer of the object being printed:

obtaining a two-dimensional map of the layer, the two-dimensional map comprising active pixels at (X,Y) positions where building material should be dispensed;

obtaining a Data Correction Filter (DCF) including a height map of the previous layer which comprises a series of (X,Y) position weighting values, each position weighting value being based on nozzle weighting values and representing the amount of material that has been cumulatively dispensed at each the (X,Y) position in the preceding layers;

comparing the data of the two-dimensional map to the data of the DCF per each (X,Y) position and determining if a nozzle should be activated at the (X,Y) position to dispense an amount of material;

printing the layer based on the data obtained in (iii);

updating the position weighting values of the height map; and adjusting the position of the print head vis a vis the printing tray.

This is followed by repeating steps (i) to (vi) above until the three-dimensional object is printed.

In embodiments, the weighting value for each nozzle of the printhead is calculated by: (a) pre-printing an object with a Y length of at least the length of the printhead, the object comprising a plurality of layers so that a print head printing profile can be observed; (b) digitizing the pre-printed object and mapping each one the print head nozzles to the profile; and (c) attributing a weighting value to each nozzle based on the digitized printing profile.

In embodiments, the two-dimensional map of the layer of step (i) is provided by a slicer software.

In embodiments, the DCF of step (ii) is stored in a computer memory.

In embodiments, the DCF further includes compensation data related to known printing phenomena and/or to the geometry of the three-dimensional object being printed.

In embodiments, step (iii) comprises for each (X,Y) position: (a) determining if the pixel of the two-dimensional map is defined as active; (b) determining if the position weighting value of the height map is equal or below a threshold value; and (c) if both (a) and (b) are true, activating the nozzle to dispense an amount of material at the (X,Y) position.

In embodiments, step (v) is performed by adding to each (X,Y) position wherein a nozzle has been activated, the weighting value of the nozzle so that the (X,Y) position weighting value is updated.

Embodiments may comprise scanning the printed layer with a sensor and modulating the DCF of the next layer with the data collected by the sensor.

In embodiments, the sensor is a CCD camera or a linear CCD camera.

In embodiments, the sensor is a proximity sensor.

Embodiments may comprise smoothing one or more printed layers with any of a planarizer, a roller and a scraper.

In embodiments, the leveling device removes less than 5-10% of the amount of material deposited in the layer.

According to a second aspect of the invention there is provided a method of additive manufacturing a three-dimensional object by layerwise deposition of a building material with an inkjet printing system comprising a print head and a building tray, the method comprising for each layer of the object being printed:

obtaining a two-dimensional map of the layer, the two-dimensional map comprising active pixels at (X,Y) positions where building material should be dispensed;

obtaining a Data Correction Filter (DCF) including a thickness map and/or a proximity map of the previous layer; the map(s) being constructed from data obtained from one or more sensors that have scanned the previous layer;

comparing the data of the two-dimensional map to the data of the DCF per each (X,Y) and determining if a nozzle should be activated at the (X,Y) position to dispense an amount of material;

printing the layer based on the data obtained in (iii); and adjusting the position of the print head vis a vis the printing tray;

repeating steps (i) to (v) above until the three-dimensional object is printed.

In embodiments, the DCF of step (ii) is stored in a computer memory.

In embodiments, step (iii) comprises for each (X,Y) position: (a) determining if the pixel of the two-dimensional map is defined as active; (b) determining if the DCF value is equal or below a threshold value; and (c) if both (a) and (b) are true, activating the nozzle to dispense an amount of material at the (X,Y) position.

According to a third aspect of the present invention there is provided a method of additive manufacturing a three-dimensional object by layerwise deposition of a building material with an inkjet printing system comprising a print head and a building tray, the method comprising:

calculating a weighting value for each nozzle of the printhead, the weighting value corresponding to an amount of material being dispensed by each of the nozzles;

for each layer of the object being printed:

obtaining a two-dimensional map of the layer, the two-dimensional map comprising active pixels at (X,Y) positions where building material should be dispensed;

obtaining a first Data Correction Filter (DCF1) including a height map of the previous layer which comprises a series of (X,Y) position weighting values, each position weighting value being based on nozzle weighting values and representing the amount of material that has been cumulatively dispensed at each the (X,Y) position in the preceding layers;

obtaining a second Data Correction Filter (DCF2) including a thickness map and/or a proximity map of the previous layer; the map(s) being constructed from data obtained from one or more sensors that have scanned the previous layer;

comparing the data of the two-dimensional map to the data provided by DCF1 and DCF2 per each (X,Y) position and determining whether a nozzle should be activated at the (X,Y) position to dispense an amount of material;

printing the layer based on the data obtained in (iv);

updating the position weighting values of the height map of DCF1; and adjusting the position of the print head vis a vis the printing tray;

repeating steps (i) to (vii) above until the three-dimensional object is printed.

According to a fourth aspect of the present invention there may be provided an inkjet additive manufacturing apparatus comprising a print head, a building tray, a controller and a computing system suitable for performing any of the above methods.

According to a further aspect of the present invention there is provided a method of additive manufacturing by depositing droplets of material from a nozzle array of an inkjet print head to print a layer, the method comprising:

obtaining a thickness profile for a layer printed by a given print head, the thickness profile comprising irregularities;

using the thickness profile applying weightings to each of a plurality of nozzles of the nozzle array;

using the nozzle weightings, generating a Data Correction Filter (DCF) to modify nozzle operation to compensate for irregularities in the thickness profile;

applying the DCF to incoming print data to produce modified print data; and printing layers using the modified print data, thereby to produce layers having actual profiles which are smoothed relative to the thickness profile.

The method may comprise refining the DCF based on variations in either of distribution and size within the plurality of nozzles.

The method may comprise inferring drop sizes from individual nozzles, and generating the nozzle weightings from the drop sizes.

The method may comprise activating individual pixels in a series to obtain the nozzle weightings.

In the method, the print data may comprise instructions for switching respective ones of the plurality of nozzles on and off over the course of printing a layer.

In the method, the thickness profile may be modified based on printing a test layer and measuring thicknesses over the test layer.

The method may comprise scanning a last printed layer for an actual layer thickness profile, and further modifying the DCF for a next layer to smooth the next layer in light of measured thicknesses in the actual layer thickness profile.

In the method, the DCF may increase densities of operational nozzles in thin parts of the profile and decreases densities of operational nozzles in thick parts of the profile.

According to a yet further aspect of the present invention there is provided a method of additive manufacturing by depositing droplets of material from a nozzle array of an inkjet print head to print a layer, the method comprising:
  scanning a currently printed layer;
  determining a thickness profile of the currently printed layer from the scanning;
  generating or modifying a DCF to modify nozzle operation to compensate for irregularities in the thickness profile;
  receiving print data;
  applying the DCF to modify the print data; and
  printing a new layer using the modified print data, thereby to produce layers having actual profiles which are smoothed relative to the thickness profile.

According to a third aspect of the present invention there is provided apparatus for additive manufacturing comprising:
  an inkjet print head comprising a nozzle array comprising nozzles for depositing droplets of material to print successive layers to form an object;
  a weighting device configured to deduce nozzle operation and drop size for a plurality of nozzles of the nozzle array and assign weightings to nozzles of the array;
  a DCF unit configured to produce a transformation that modifies the weightings to smooth the layer profile, wherein the apparatus is configured to apply the DCF to printing plans to print a smooth layer.

According to a yet further aspect of the present invention there is provided apparatus for additive manufacturing comprising:
  an inkjet print head comprising a nozzle array comprising nozzles for depositing droplets of material to print successive layers to form an object;
  a scanner for obtaining a profile of thicknesses of a printed layer;
  a DCF unit associated with the scanner and configured to modify weightings applied to the nozzles, the modification comprising weighting the nozzles to cancel out irregularities in the profile and thereby produce a smooth layer.

In an embodiment, the object is printed on a tray, the object being kept at a fixed distance from the nozzle array as new layers are added to the object, and wherein the profile is fed back to regulate the object height.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

The patent or application file contains at least one drawing executed in color. Copies of this patent or patent application publication with color drawing(s) will be provided by the Office upon request and payment of the necessary fee.

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIG. 1 is a simplified diagram illustrating the use of a roller for smoothing a layer after printing according to the known art;

FIGS. 2A-2C are simplified diagrams showing various problems that give rise to irregularities in the printed layer that require the use of a roller according to FIG. 1;

FIG. 3 is a simplified flow chart of the roller system according to the known art;

FIG. 4A is a simplified flow chart illustrating a method of applying pre-printing corrections to smooth a layer according to embodiments of the present invention;

FIG. 4B is a simplified flow chart illustrating a way of generating a DCF function for modifying operation of the nozzles according to embodiments of the present invention;

FIG. 5 is a simplified diagram illustrating an embodiment for real time correction of the nozzles based on scanning layer thicknesses according to the present invention;

FIG. 6 is a simplified diagram illustrating experimental data showing the process of FIG. 4A;

FIG. 7 is a simplified flow chart showing a process for calibrating the DCF according to an embodiment of the present invention;

FIG. 8 is a simplified flow chart illustrating a procedural loop for carrying out the process of FIG. 4A for multiple nozzles and print heads;

FIG. 9 is a simplified flow chart illustrating a procedural loop for carrying out the process of FIG. 5 for multiple nozzles and print heads.

FIG. 10 is a simplified diagram showing how weightings applied to print nozzles may lead to a transfer function for printing a layer;

Figure 4A:
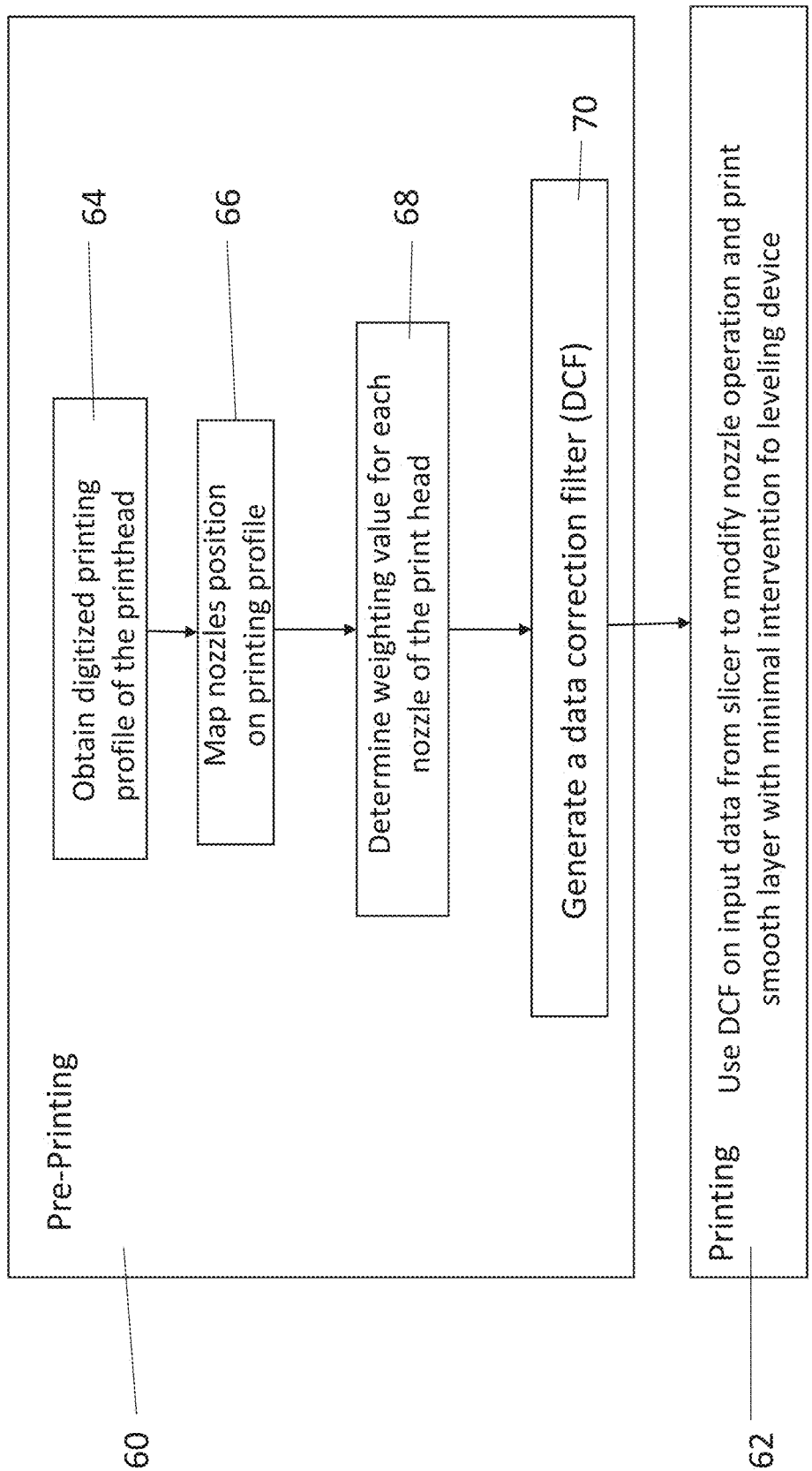
Figure 5:
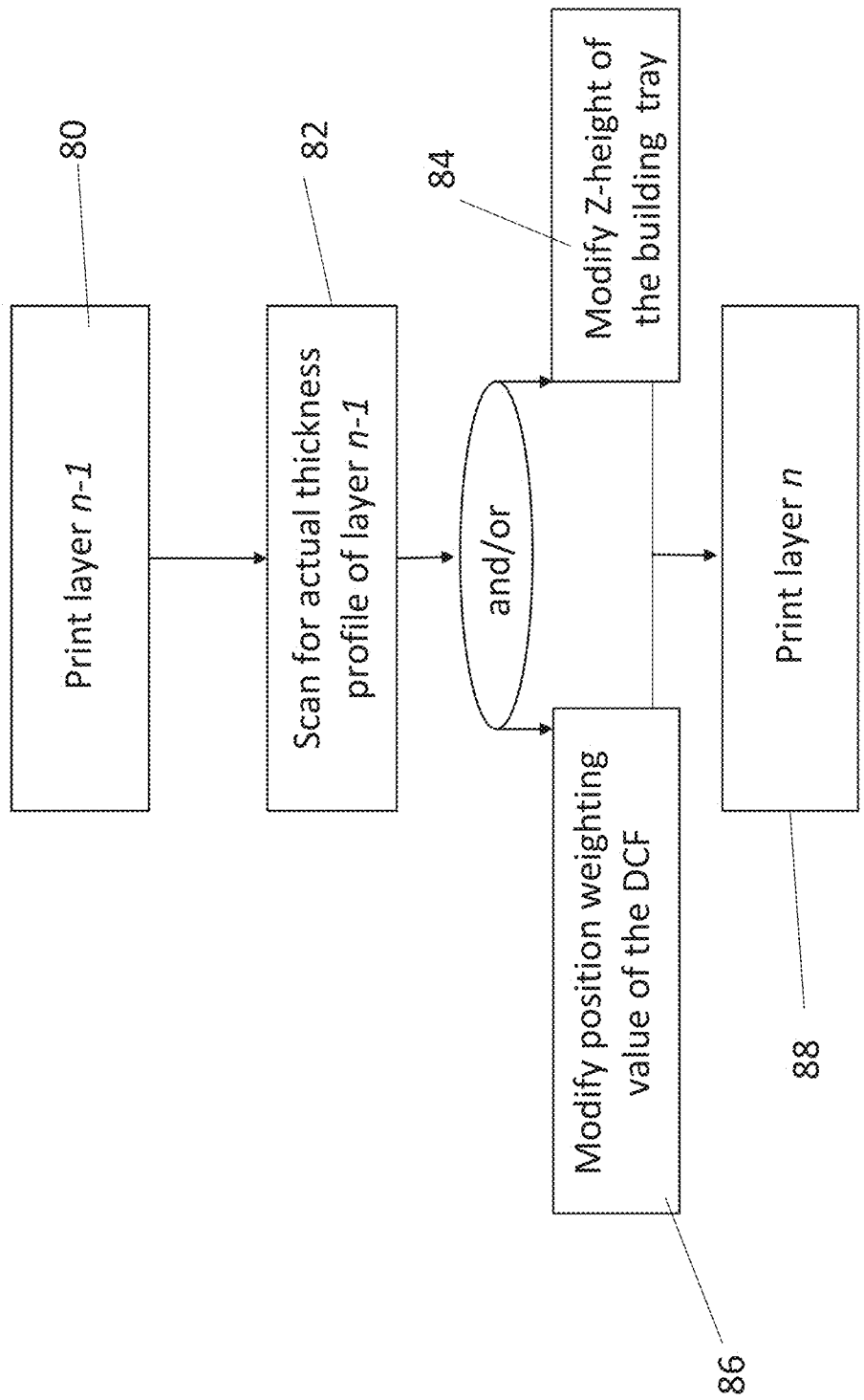
Figure 11:
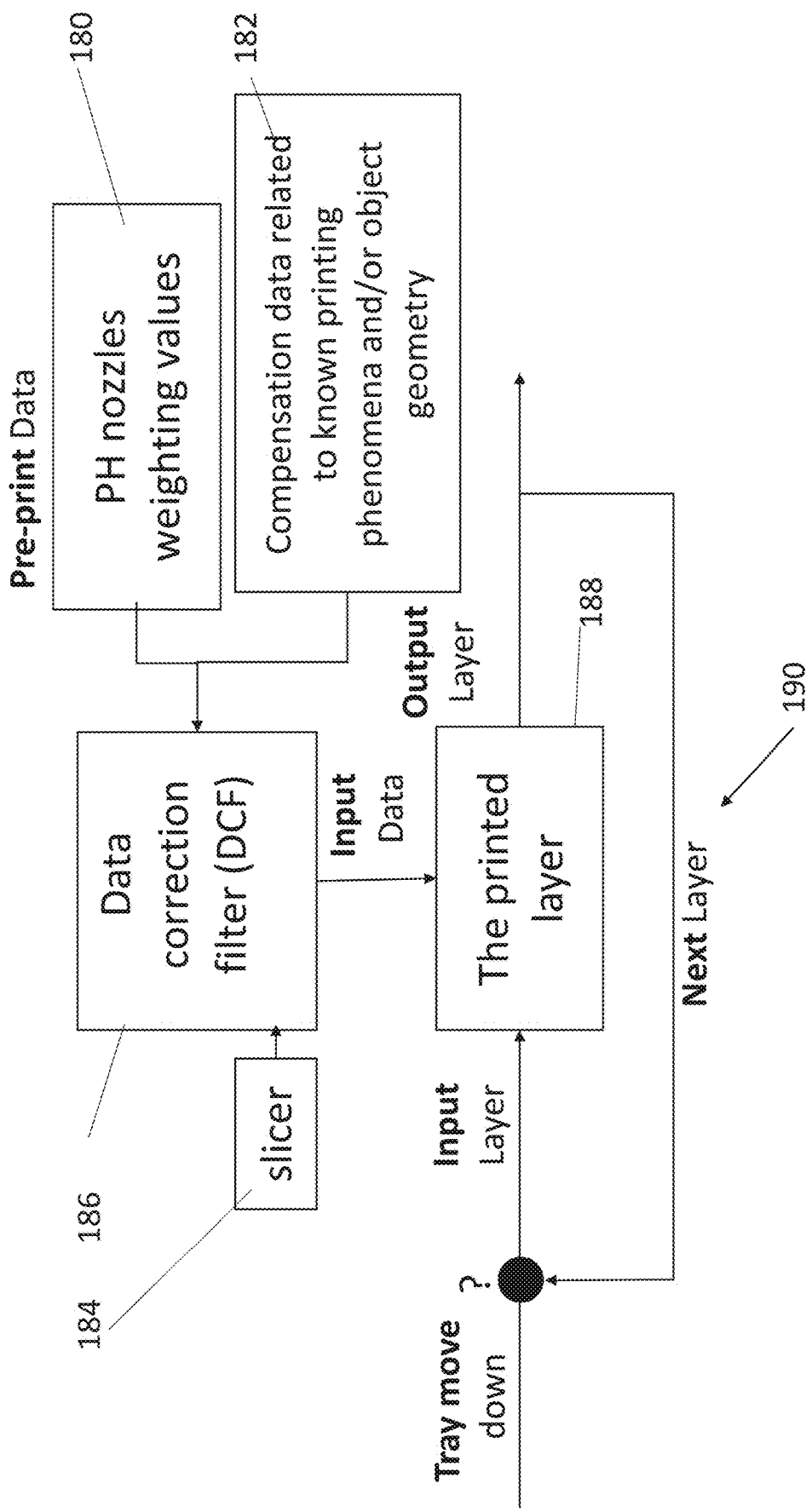
Figure 12:
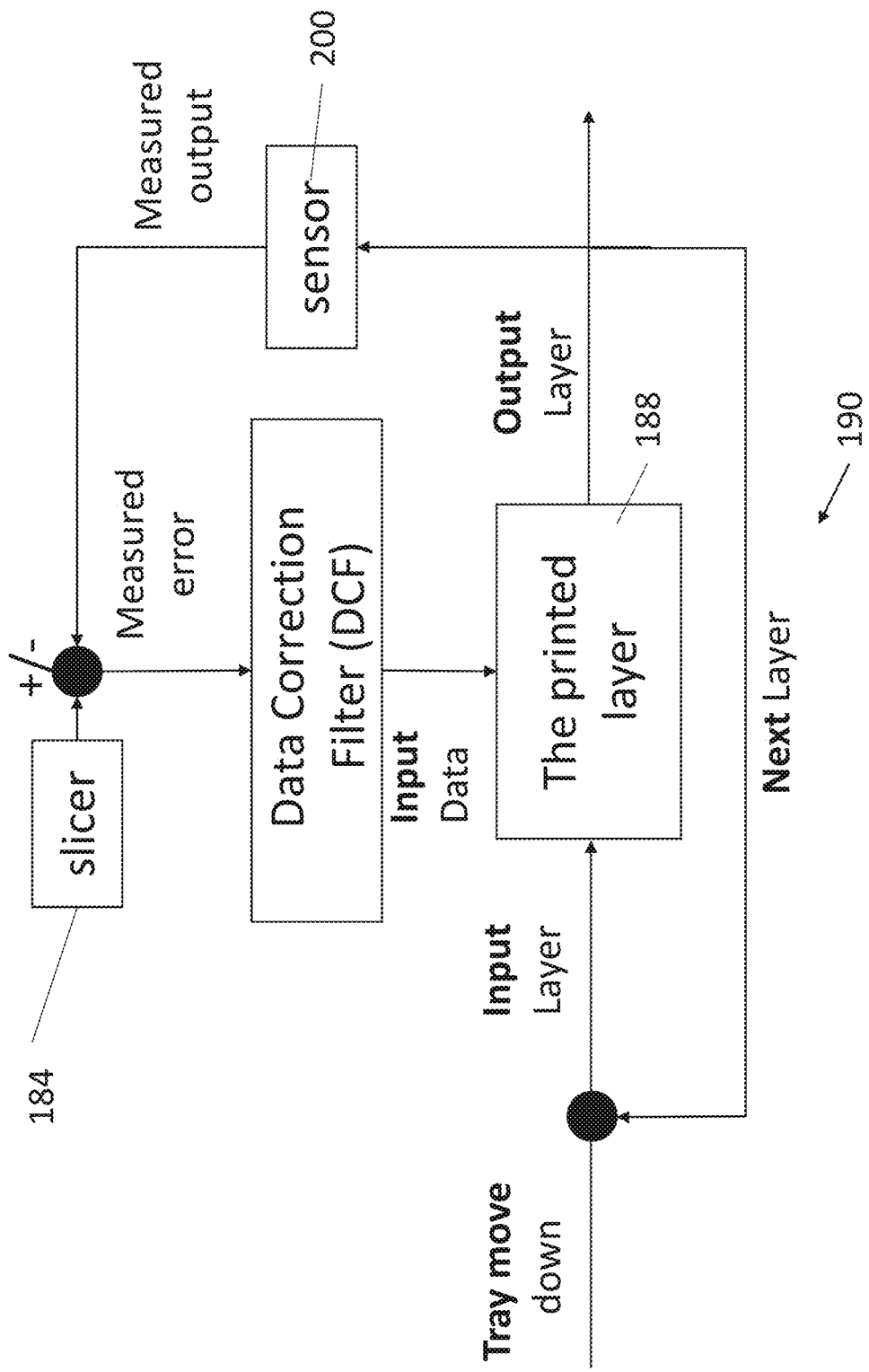
Figure 13:
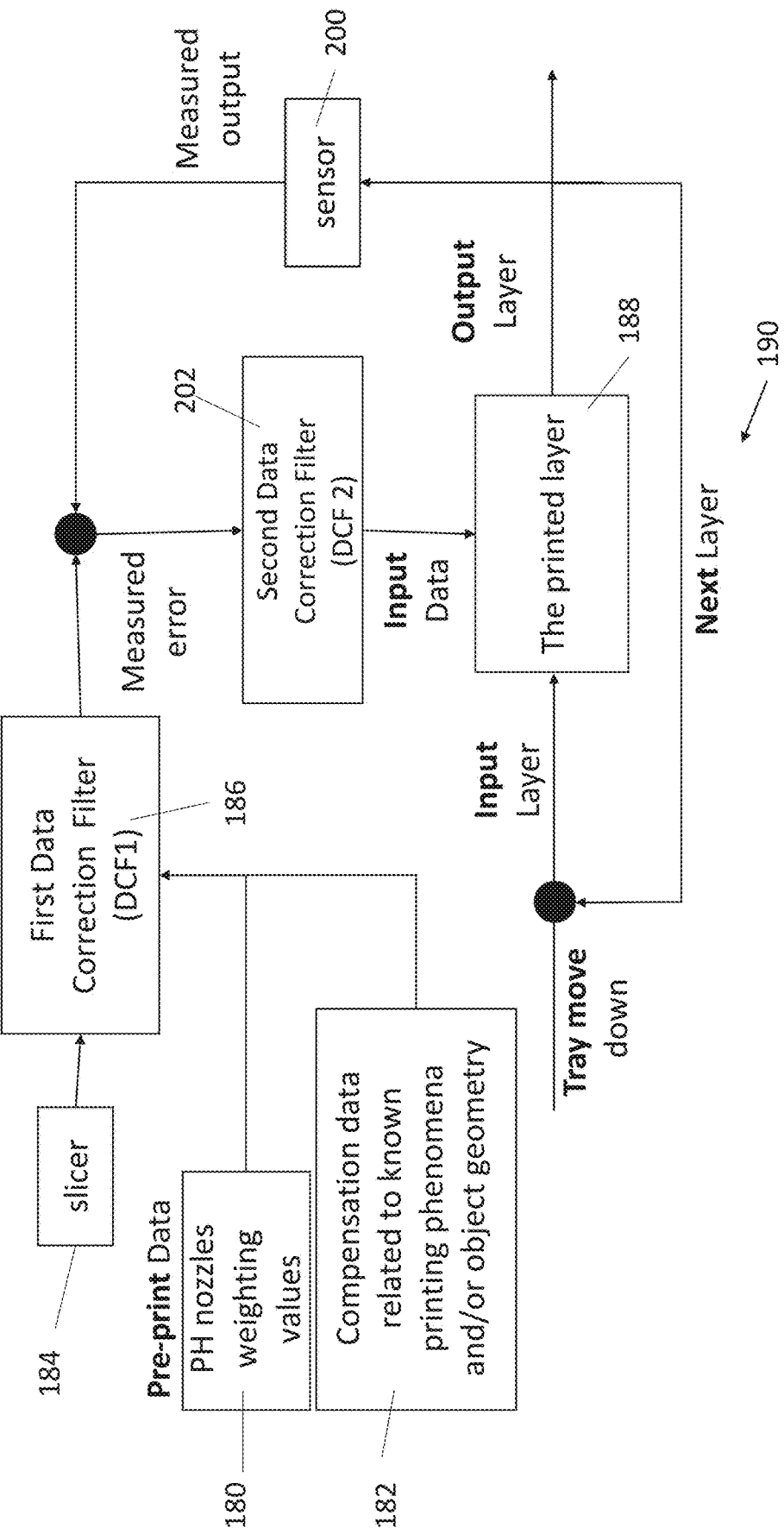
Figure 15A:
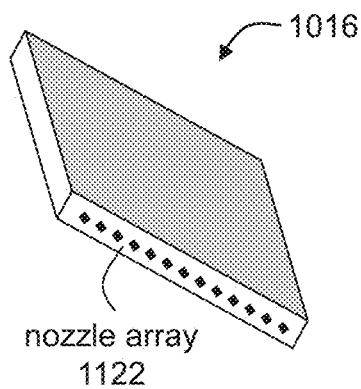
Figure 15B:
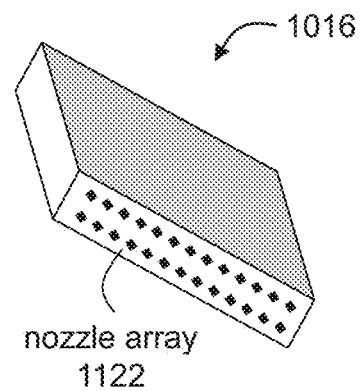
Figure 15C:
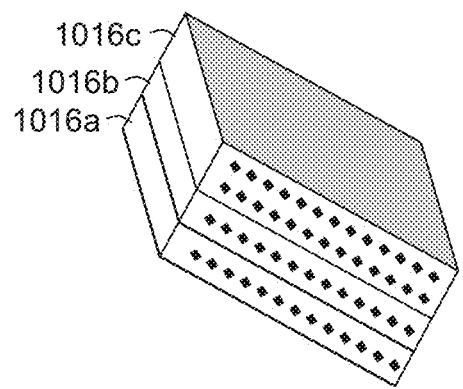
Figure 16A:
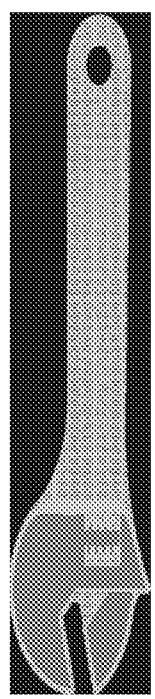
Figure 16B:
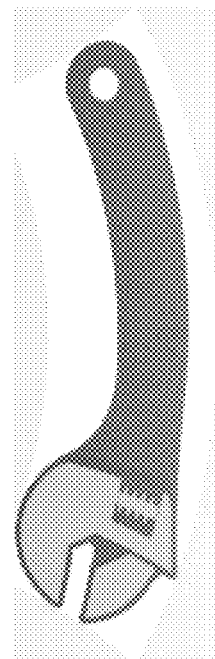

FIG. 11 is a simplified diagram showing in greater detail the embodiment of FIG. 4A;

FIG. 12 is a simplified diagram showing in greater detail the embodiment of FIG. 5;

FIG. 13 is a simplified diagram showing an embodiment that combines the features of FIG. 4A and FIG. 5;

FIGS. 14A-D are schematic illustrations of an additive manufacturing system according to some embodiments of the invention;

FIGS. 15A-C are schematic illustrations of printing heads according to some embodiments of the present invention; and FIGS. 16A and 16B are schematic illustrations demonstrating coordinate transformations according to some embodiments of the present invention.

DESCRIPTION OF SPECIFIC EMBODIMENTS OF THE INVENTION

The present invention, in some embodiments thereof, relates to a method and apparatus for minimizing the need for a leveling device or planarizer (e.g. roller, scraper) in additive manufacturing or 3D printing and more particularly but not exclusively to ways of depositing a layer in additive manufacturing in a manner that provides smooth and consistent layers.

A method of additive manufacturing according to the present embodiments may involve depositing droplets of material from a nozzle array of an inkjet print head to print a layer, and obtaining a thickness profile for the layer as printed by a given print head. The thickness profile is generally not smooth but rather includes irregularities for reasons which are explained hereinbelow. The thickness profile is used to apply weightings to individual nozzles in the nozzle array. Then a DCF function is generated which modifies the weightings, and thus nozzle operation, to compensate for the irregularities and thus generate a smoother profile. The DCF is used to modify incoming print data to print a layer with a smoother profile. The DCF may be based on pre-print data, or on real time scanning of the layer profile as printed or on a combination of both pre-printing and real time scanning data.

A method of additive manufacturing a three-dimensional object by layerwise deposition of a building material with an inkjet printing system using a print head and a building tray, comprises calculating a weighting value for each nozzle, then for each layer obtaining a 2-D map of the layer, comprising active pixels at building material dispensing positions; obtaining a Data Correction Filter (DCF) including a height map of the previous layer, comparing the data of the 2D map to the data of the DCF at each position and determining if the nozzle at that position should dispense, then printing the layer, updating the weighting values and adjusting the position of the print head vis a vis the printing tray. The above is repeated until the three-dimensional object is printed. The method and system of the present embodiments manufacture three-dimensional objects based on computer object data in a layerwise manner by forming a plurality of layers in a configured pattern corresponding to the shape of the objects. The computer object data can be in any known format, including, without limitation, a Standard Tessellation Language (STL) or a StereoLithography Contour (SLC) format, Virtual Reality Modeling Language (VRML), Additive Manufacturing File (AMF) format, Drawing Exchange Format (DXF), Polygon File Format (PLY) or any other format suitable for Computer-Aided Design (CAD).

The term "object" as used herein refers to a whole object or a part thereof.

Each layer is formed by additive manufacturing apparatus which scans a two-dimensional surface and patterns it. While scanning, the apparatus visits a plurality of target locations on the two-dimensional layer or surface, and decides, for each target location or a group of target locations, whether or not the target location or group of target locations is to be occupied by building material formulation, and which type of building material formulation is to be delivered thereto. The decision is made according to a computer image of the surface.

In preferred embodiments of the present invention the AM comprises three-dimensional printing, more preferably three-dimensional inkjet printing. In these embodiments a building material formulation is dispensed from a dispensing head having a set of nozzles to deposit building material formulation in layers on a supporting structure. The AM apparatus thus dispenses building material formulation in target locations which are to be occupied and leaves other target locations void. The apparatus typically includes a plurality of dispensing heads, each of which can be configured to dispense a different building material formulation. Thus, different target locations can be occupied by different building material formulations. The types of building material formulations can be categorized into two major categories: modeling material formulation and support material formulation. The support material formulation serves as a supporting matrix or construction for supporting the object or object parts during the fabrication process and/or other purposes, e.g., providing hollow or porous objects. Support constructions may additionally include modeling material formulation elements, e.g. for further support strength.

The modeling material formulation is generally a composition which is formulated for use in additive manufacturing and which is able to form a three-dimensional object on its own, i.e., without having to be mixed or combined with any other substance.

The final three-dimensional object is made of the modeling material formulation or a combination of modeling material formulations or modeling and support material formulations or modification thereof (e.g., following curing). All these operations are well-known to those skilled in the art of solid freeform fabrication.

In some exemplary embodiments of the invention an object is manufactured by dispensing two or more different modeling material formulations, each material formulation from a different dispensing head of the AM. The material formulations are optionally and preferably deposited in layers during the same pass of the printing heads. The material formulations and combination of material formulations within the layer are selected according to the desired properties of the object.

Figure 14A:
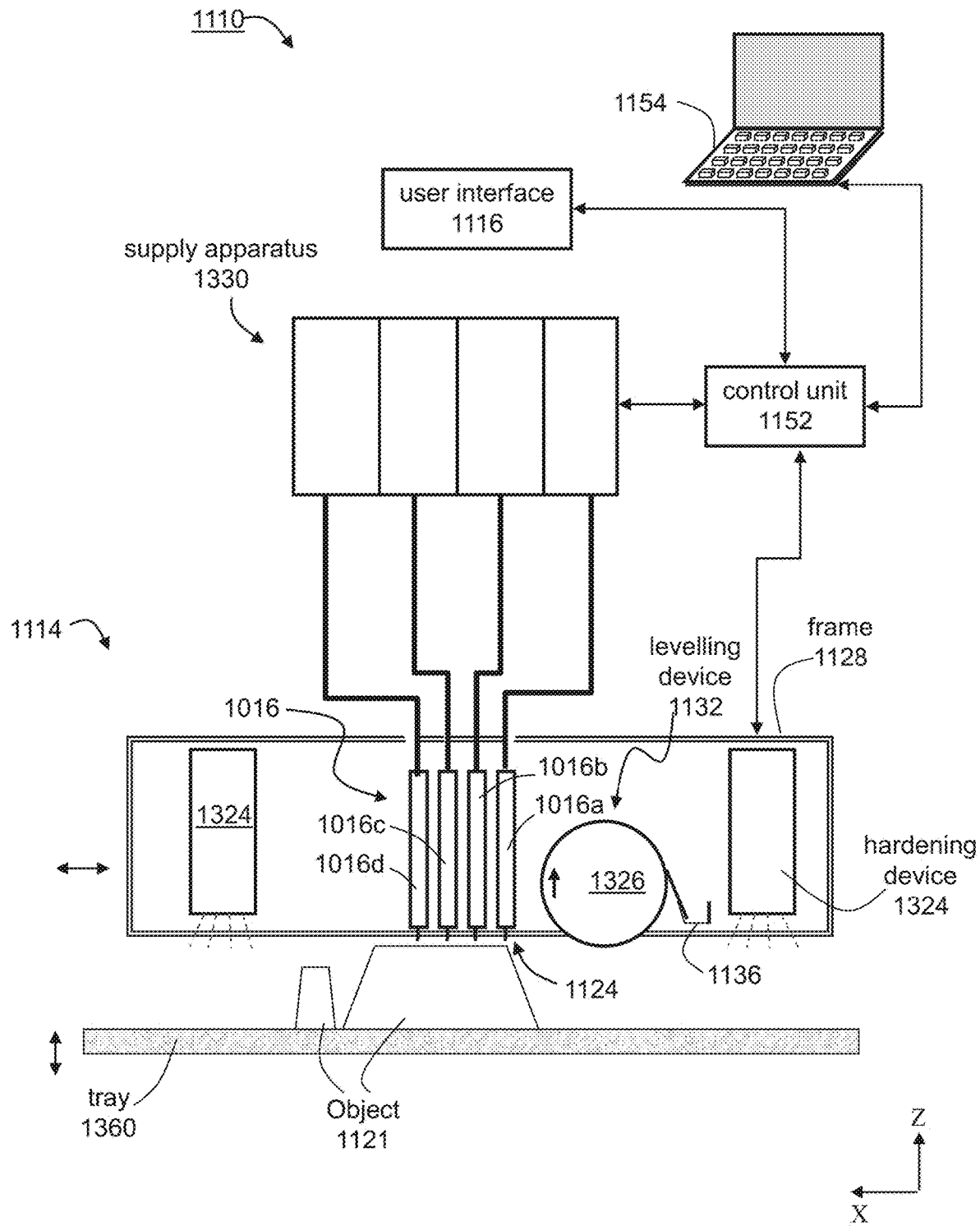

A representative and non-limiting example of a system 1110 suitable for AM of an object 1112 according to some embodiments of the present invention is illustrated in FIG. 14A. System 1110 comprises an additive manufacturing apparatus 1114 having a dispensing unit 1016 which comprises a plurality of dispensing heads. Each head preferably comprises an array of one or more nozzles 1122, as illustrated in FIGS. 15A-C described below, through which a liquid building material formulation 1124 is dispensed.

Preferably, but not obligatorily, apparatus 1114 is a three-dimensional printing apparatus, in which case the dispensing heads are printing heads, and the building material formulation is dispensed via inkjet technology. This need not necessarily be the case, since, for some applications, it may not be necessary for the additive manufacturing apparatus to employ three-dimensional printing techniques. Representative examples of additive manufacturing apparatus contemplated according to various exemplary embodiments of the present invention include, without limitation, fused deposition modeling apparatus and fused material formulation deposition apparatus.

Each dispensing head is optionally and preferably fed via a building material formulation reservoir which may optionally include a temperature control unit (e.g., a temperature sensor and/or a heating device), and a material formulation level sensor. To dispense the building material formulation, a voltage signal is applied to the dispensing heads to selectively deposit droplets of material formulation via the dispensing head nozzles, for example, as in piezoelectric inkjet printing technology. The dispensing rate of each head depends on the number of nozzles, the type of nozzles and the applied voltage signal rate (frequency). Such dispensing heads are known to those skilled in the art of solid freeform fabrication.

Preferably, but not obligatorily, the overall number of dispensing nozzles or nozzle arrays is selected such that half of the dispensing nozzles are designated to dispense support material formulation and half of the dispensing nozzles are designated to dispense modeling material formulation, i.e. the number of nozzles jetting modeling material formulations is the same as the number of nozzles jetting support material formulation. In the representative example of FIG. 14A, four dispensing heads 1016*a*, 1016*b*, 1016*c* and 1016*d* are illustrated. Each of heads 1016*a*, 1016*b*, 1016*c* and 1016*d* has a nozzle array. In this Example, heads 1016*a* and 1016*b* can be designated for modeling material formulation/s and heads 1016*c* and 1016*d* can be designated for support material formulation. Thus, head 1016*a* can dispense a first modeling material formulation, head 1016*b* can dispense a second modeling material formulation and heads 1016*c* and 1016*d* can both dispense support material formulation. In an alternative embodiment, heads 1016*c* and 1016*d*, for example, may be combined in a single head having two nozzle arrays for depositing support material formulation. In some further embodiments, at least one of the printing heads can dispense at least two distinct building materials via two distinct arrays of nozzles (e.g. one support material and one model material, or two distinct modeling materials).

Yet it is to be understood that it is not intended to limit the scope of the present invention and that the number of modeling material formulation depositing heads (modeling heads) and the number of support material formulation depositing heads (support heads) may differ. Generally, the number of modeling heads, the number of support heads and the number of nozzles in each respective head or head array are selected such as to provide a predetermined ratio, a, between the maximal dispensing rate of the support material formulation and the maximal dispensing rate of modeling material formulation. The value of the predetermined ratio, a, is preferably selected to ensure that in each formed layer, the height of modeling material formulation equals the height of support material formulation. Typical values for a are from about 0.6 to about 1.5.

As used herein the term "about" refers to ±10%.

For example, for a=1, the overall dispensing rate of support material formulation is generally the same as the overall dispensing rate of the modeling material formulation when all modeling heads and support heads operate.

In a preferred embodiment, there are M modeling heads each having m arrays of p nozzles, and S support heads each having s arrays of q nozzles such that M×m×p=S×s×q. Each of the M×m modeling arrays and S xs support arrays can be manufactured as a separate physical unit, which can be assembled and disassembled from the group of arrays. In this embodiment, each such array optionally and preferably comprises a temperature control unit and a material formulation level sensor of its own, and receives an individually controlled voltage for its operation.

Apparatus 1114 can further comprise a solidifying device 1324 which can include any device configured to emit light, heat or the like that may cause the deposited material formulation to hardened. For example, solidifying device 1324 can comprise one or more radiation sources, which can be, for example, an ultraviolet or visible or infrared lamp, or other sources of electromagnetic radiation, or electron beam source, depending on the modeling material formulation being used. In some embodiments of the present invention, solidifying device 1324 serves for curing or solidifying the modeling material formulation.

The dispensing head and radiation source are preferably mounted in a frame or block 1128 which is preferably operative to reciprocally move over a tray 1360, which serves as the working surface. In some embodiments of the present invention the radiation sources are mounted in the block such that they follow in the wake of the dispensing heads to at least partially cure or solidify the material formulations just dispensed by the dispensing heads. Tray 1360 is positioned horizontally. According to the common conventions an X-Y-Z Cartesian coordinate system is selected such that the X-Y plane is parallel to tray 1360. Tray 1360 is preferably configured to move vertically (along the Z direction), typically downward. In various exemplary embodiments of the invention, apparatus 1114 further comprises one or more leveling devices or planarizer 1132, e.g. including a roller 1326. Leveling device 1132 serves to straighten, level and/or establish a thickness of the newly formed layer prior to the formation of the successive layer thereon. Leveling device 1132 preferably comprises a waste collection device 1136 for collecting the excess material formulation generated during leveling. Waste collection device 1136 may comprise any mechanism that delivers the material formulation to a waste tank or waste cartridge.

In use, the dispensing heads of unit 1016 move in a scanning direction, which is referred to herein as the X direction, and selectively dispense building material formulation in a predetermined configuration in the course of their passage over tray 1360. The building material formulation typically comprises one or more types of support material formulation and one or more types of modeling material formulation. The passage of the dispensing heads of unit 1016 is followed by the curing of the modeling material formulation(s) by radiation source 1126. In the reverse passage of the heads, back to their starting point for the layer just deposited, an additional dispensing of building material formulation may be carried out, according to predetermined configuration. In the forward and/or reverse passages of the dispensing heads, the layer thus formed may be straightened by leveling device 1326, which preferably follows the path of the dispensing heads in their forward and/or reverse movement. Once the dispensing heads return to their starting point along the X direction, they may move to another position along an indexing direction, referred to herein as the Y direction, and continue to build the same layer by reciprocal movement along the X direction. Alternately, the dispensing heads may move in the Y direction between forward and reverse movements or after more than one forward-reverse movement. The series of scans performed by the dispensing heads to complete a single layer is referred to herein as a single scan cycle.

Once the layer is completed, tray 1360 is lowered in the Z direction to a predetermined Z level, according to the desired thickness of the layer subsequently to be printed. The procedure is repeated to form three-dimensional object 1112 in a layerwise manner.

In another embodiment, tray 1360 may be displaced in the Z direction between forward and reverse passages of the dispensing head of unit 1016, within the layer. Such Z displacement is carried out in order to cause contact of the leveling device with the surface in one direction and prevent contact in the other direction.

System 1110 optionally and preferably comprises a building material formulation supply system 1330 which comprises the building material formulation containers or cartridges and supplies a plurality of building material formulations to fabrication apparatus 1114.

A control unit 1340 controls fabrication apparatus 1114 and optionally and preferably also supply system 1330. Control unit 1340 typically includes an electronic circuit configured to perform the controlling operations. Control unit 1340 preferably communicates with a data processor 1154 which transmits digital data pertaining to fabrication instructions based on computer object data, e.g., a CAD configuration represented on a computer readable medium in a form of a Standard Tessellation Language (STL) format or the like. Typically, control unit 1340 controls the voltage applied to each dispensing head or nozzle array and the temperature of the building material formulation in the respective printing head.

Once the manufacturing data is loaded to control unit 1340 it can operate without user intervention. In some embodiments, control unit 1340 receives additional input from the operator, e.g., using data processor 1154 or using a user interface 1116 communicating with unit 1340. User interface 1116 can be of any type known in the art, such as, but not limited to, a keyboard, a touch screen and the like. For example, control unit 1340 can receive, as additional input, one or more building material formulation types and/or attributes, such as, but not limited to, color, characteristic distortion and/or transition temperature, viscosity, electrical property, magnetic property. Other attributes and groups of attributes are also contemplated.

Figure 14B:
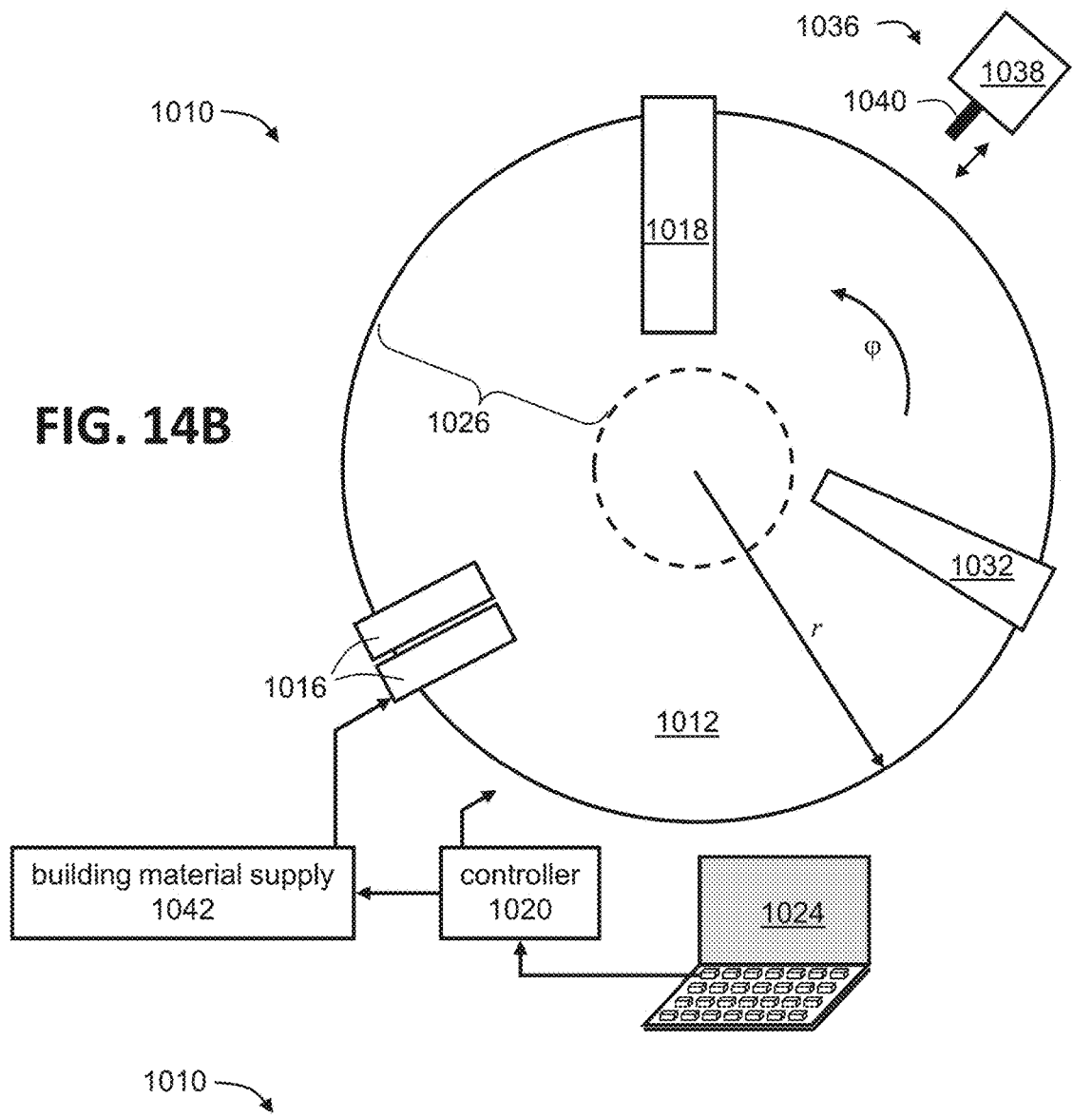
Figure 14C:
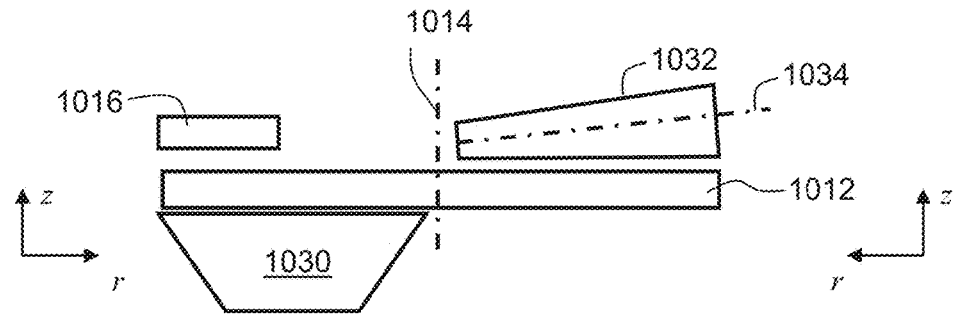
Figure 14D:
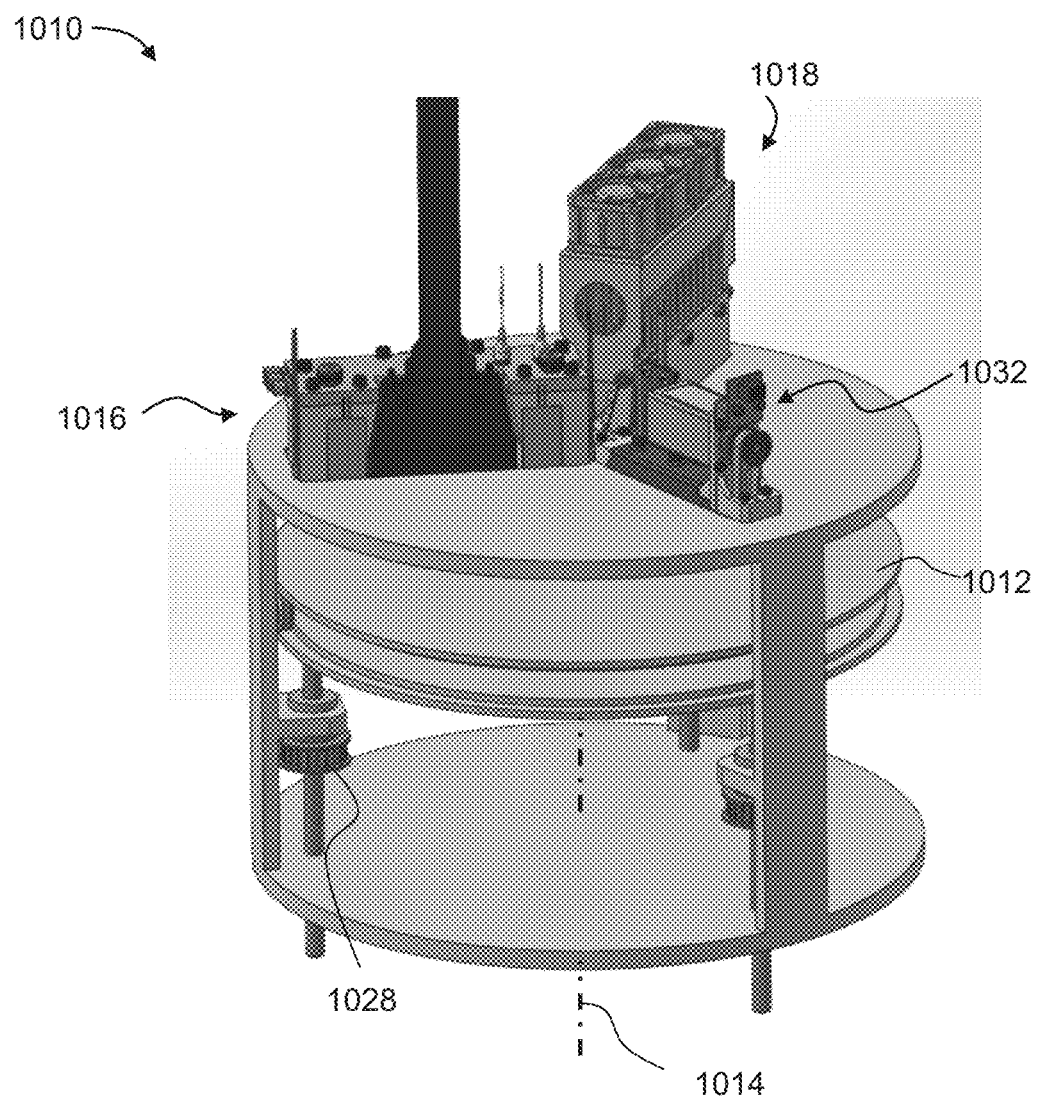

Another representative and non-limiting example of a system 1010 suitable for AM of an object according to some embodiments of the present invention is illustrated in FIGS. 14B-D. FIGS. 14B-D illustrate a top view (FIG. 14B), a side view (FIG. 14C) and an isometric view (FIG. 14D) of system 1010.

In the present embodiments, system 1010 comprises a tray 1012 and a plurality of inkjet printing heads 1016, each having a plurality of separated nozzles. Tray 1012 can have a shape of a disk or it can be annular. Non-round shapes are also contemplated, provided they can be rotated about a vertical axis.

Tray 1012 and heads 1016 are optionally and preferably mounted such as to allow a relative rotary motion between tray 1012 and heads 1016. This can be achieved by (i) configuring tray 1012 to rotate about a vertical axis 1014 relative to heads 1016, (ii) configuring heads 1016 to rotate about vertical axis 1014 relative to tray 1012, or (iii) configuring both tray 1012 and heads 1016 to rotate about vertical axis 1014 but at different rotation velocities (e.g., rotation at opposite direction). While the embodiments below are described with a particular emphasis to configuration (i) wherein the tray is a rotary tray that is configured to rotate about vertical axis 1014 relative to heads 1016, it is to be understood that the present application contemplates also configurations (ii) and (iii). Any one of the embodiments described herein can be adjusted to be applicable to any of configurations (ii) and (iii), and one of ordinary skills in the art, provided with the details described herein, would know how to make such adjustment.

In the following description, a direction parallel to tray 1012 and pointing outwardly from axis 1014 is referred to as the radial direction r, a direction parallel to tray 1012 and perpendicular to the radial direction r is referred to herein as the azimuthal direction φ, and a direction perpendicular to tray 1012 is referred to herein is the vertical direction z.

The term "radial position," as used herein, refers to a position on or above tray 1012 at a specific distance from axis 1014. When the term is used in connection to a printing head, the term refers to a position of the head which is at specific distance from axis 1014. When the term is used in connection to a point on tray 1012, the term corresponds to any point that belongs to a locus of points that is a circle whose radius is the specific distance from axis 1014 and whose center is at axis 1014.

The term "azimuthal position," as used herein, refers to a position on or above tray 1012 at a specific azimuthal angle relative to a predetermined reference point. Thus, radial position refers to any point that belongs to a locus of points that is a straight line forming the specific azimuthal angle relative to the reference point.

The term "vertical position," as used herein, refers to a position over a plane that intersect the vertical axis 1014 at a specific point.

Tray 1012 serves as a supporting structure for three-dimensional printing. The working area on which one or objects are printed is typically, but not necessarily, smaller than the total area of tray 1012. In some embodiments of the present invention the working area is annular. The working area is shown at 1026. In some embodiments of the present invention tray 1012 rotates continuously in the same direction throughout the formation of object, and in some embodiments of the present invention tray reverses the direction of rotation at least once (e.g., in an oscillatory manner) during the formation of the object. Tray 1012 is optionally and preferably removable. Removing tray 1012 can be for maintenance of system 1010, or, if desired, for replacing the tray before printing a new object. In some embodiments of the present invention system 1010 is provided with one or more different replacement trays (e.g., a kit of replacement trays), wherein two or more trays are designated for different types of objects (e.g., different weights) different operation modes (e.g., different rotation speeds), etc. The replacement of tray 1012 can be manual or automatic, as desired. When automatic replacement is employed, system 1010 comprises a tray replacement device 1036 configured for removing tray 1012 from its position below heads 1016 and replacing it by a replacement tray (not shown). In the representative illustration of FIG. 14B tray replacement device 1036 is illustrated as a drive 1038 with a movable arm 1040 configured to pull tray 1012, but other types of tray replacement devices are also contemplated.

Exemplified embodiments for the printing head 1016 are illustrated in FIGS. 15A-15C. These embodiments can be employed for any of the AM systems described above, including, without limitation, system 1110 and system 1010.

FIGS. 15A-B illustrate a printing head 1016 with one (FIG. 15A) and two (FIG. 15B) nozzle arrays 1022. The nozzles in the array are preferably aligned linearly, along a straight line. In embodiments in which a particular printing head has two or more linear nozzle arrays, the nozzle arrays are optionally and preferably can be parallel to each other.

When a system similar to system 1110 is employed, all printing heads 1016 are optionally and preferably oriented along the indexing direction with their positions along the scanning direction being offset to one another.

When a system similar to system 1010 is employed, all printing heads 1016 are optionally and preferably oriented radially (parallel to the radial direction) with their azimuthal positions being offset to one another. Thus, in these embodiments, the nozzle arrays of different printing heads are not parallel to each other but are rather at an angle to each other, which angle being approximately equal to the azimuthal offset between the respective heads. For example, one head can be oriented radially and positioned at azimuthal position $\varphi_1$, and another head can be oriented radially and positioned at azimuthal position $\varphi_2$. In this example, the azimuthal offset between the two heads is $\varphi_1$-$\varphi_2$, and the angle between the linear nozzle arrays of the two heads is also $\varphi_1$-$\varphi_2$.

In some embodiments, two or more printing heads can be assembled to a block of printing heads, in which case the printing heads of the block are typically parallel to each other. A block including several inkjet printing heads 1016a, 1016b, 1016c is illustrated in FIG. 15C.

In some embodiments, system 1010 comprises a stabilizing structure 1030 positioned below heads 1016 such that tray 1012 is between stabilizing structure 1030 and heads 1016. stabilizing structure 1030 may serve for preventing or reducing vibrations of tray 1012 that may occur while inkjet printing heads 1016 operate. In configurations in which printing heads 1016 rotate about axis 1014, stabilizing structure 1030 preferably also rotates such that stabilizing structure 1030 is always directly below heads 1016 (with tray 1012 between heads 1016 and tray 1012).

Tray 1012 and/or printing heads 1016 are optionally and preferably configured to move along the vertical direction z, parallel to vertical axis 1014 so as to vary the vertical distance between tray 1012 and printing heads 1016. In configurations in which the vertical distance is varied by moving tray 1012 along the vertical direction, stabilizing structure 1030 preferably also moves vertically together with tray 1012. In configurations in which the vertical distance is varied by heads 1016 along the vertical direction, while maintaining the vertical position of tray 1012 fixed, support stabilizing 1030 is also maintained at a fixed vertical position.

The vertical motion can be established by a vertical drive 1028. Once a layer is completed, the vertical distance between tray 1012 and heads 1016 can be increased (e.g., tray 1012 is lowered relative to heads 1016) by a predetermined vertical step, according to the desired thickness of the layer subsequently to be printed. The procedure is repeated to form a three-dimensional object in a layerwise manner.

The operation of inkjet printing heads 1016 and optionally and preferably also of one or more other components of system 1010, e.g., the motion of tray 1012, are controlled by a controller 1020. The controller can have an electronic circuit and a non-volatile memory medium readable by the circuit, wherein the memory medium stores program instructions which, when read by the circuit, cause the circuit to perform control operations as further detailed below.

Controller 1020 can also communicate with a host computer 1024 which transmits digital data pertaining to fabrication instructions based on computer object data, e.g., in a form of a Standard Tessellation Language (STL) or a StereoLithography Contour (SLC) format, Virtual Reality Modeling Language (VRML), Additive Manufacturing File (AMF) format, Drawing Exchange Format (DXF), Polygon File Format (PLY) or any other format suitable for Computer-Aided Design (CAD). The object data formats are typically structured according to a Cartesian system of coordinates. In these cases, computer 1024 preferably executes a procedure for transforming the coordinates of each slice in the computer object data from a Cartesian system of coordinates into a polar system of coordinates. Computer 1024 optionally and preferably transmits the fabrication instructions in terms of the transformed system of coordinates. Alternatively, computer 1024 can transmit the fabrication instructions in terms of the original system of coordinates as provided by the computer object data, in which case the transformation of coordinates is executed by the circuit of controller 1020.

The transformation of coordinates allows three-dimensional printing over a rotating tray. In conventional three-dimensional printing, the printing heads reciprocally move above a stationary tray along straight lines. In such conventional systems, the printing resolution is the same at any point over the tray, provided the dispensing rates of the heads are uniform. Unlike conventional three-dimensional printing, not all the nozzles of the head points cover the same distance over tray 1012 during at the same time. The transformation of coordinates is optionally and preferably executed so as to ensure equal amounts of excess material formulation at different radial positions. Representative examples of coordinate transformations according to some embodiments of the present invention are provided in FIGS. 16A-B, showing three slices of an object (each slice corresponds to fabrication instructions of a different layer of the objects), where FIG. 16A illustrates a slice in a Cartesian system of coordinates and FIG. 16B illustrates the same slice following an application of a transformation of coordinates procedure to the respective slice.

Typically, controller 1020 controls the voltage applied to the respective component of the system 1010 based on the fabrication instructions and based on the stored program instructions as described below.

Generally, controller 1020 controls printing heads 1016 to dispense, during the rotation of tray 1012, droplets of building material formulation in layers, such as to print a three-dimensional object on tray 1012.

System 1010 optionally and preferably comprises one or more radiation sources 1018, which can be, for example, an ultraviolet or visible or infrared lamp, or other sources of electromagnetic radiation, or electron beam source, depending on the modeling material formulation being used. Radiation source can include any type of radiation emitting device, including, without limitation, light emitting diode (LED), digital light processing (DLP) system, resistive lamp and the like. Radiation source 1018 serves for curing or solidifying the modeling material formulation. In various exemplary embodiments of the invention the operation of radiation source 1018 is controlled by controller 1020 which may activate and deactivate radiation source 1018 and may optionally also control the amount of radiation generated by radiation source 1018.

In some embodiments of the invention, system 1010 further comprises one or more leveling devices 1032 which can be manufactured as a roller or a blade. Leveling device 1032 serves to straighten the newly formed layer prior to the formation of the successive layer thereon. In some embodiments, leveling device 1032 has the shape of a conical roller positioned such that its symmetry axis 1034 is tilted relative to the surface of tray 1012 and its surface is parallel to the surface of the tray. This embodiment is illustrated in the side view of system 1010 (FIG. 14C).

The conical roller can have the shape of a cone or a conical frustum.

The opening angle of the conical roller is preferably selected such that is a constant ratio between the radius of the cone at any location along its axis 1034 and the distance between that location and axis 1014. This embodiment allows roller 1032 to efficiently level the layers, since while the roller rotates, any point p on the surface of the roller has a linear velocity which is proportional (e.g., the same) to the linear velocity of the tray at a point vertically beneath point p. In some embodiments, the roller has a shape of a conical frustum having a height h, a radius $R_1$ at its closest distance from axis 1014, and a radius $R_2$ at its farthest distance from axis 1014, wherein the parameters h, $R_1$ and $R_2$ satisfy the relation $R_1/R_2=(R-h)/h$ and wherein R is the farthest distance of the roller from axis 1014 (for example, R can be the radius of tray 1012).

The operation of leveling device 1032 is optionally and preferably controlled by controller 1020 which may activate and deactivate leveling device 1032 and may optionally also control its position along a vertical direction (parallel to axis 1014) and/or a radial direction (parallel to tray 1012 and pointing toward or away from axis 1014.

In some embodiments of the present invention printing heads 1016 are configured to reciprocally move relative to tray along the radial direction r. These embodiments are useful when the lengths of the nozzle arrays 1022 of heads 1016 are shorter than the width along the radial direction of the working area 1026 on tray 1012. The motion of heads 1016 along the radial direction is optionally and preferably controlled by controller 1020.

Some embodiments contemplate the fabrication of an object by dispensing different material formulations from different dispensing heads. These embodiments provide, inter alia, the ability to select material formulations from a given number of material formulations and define desired combinations of the selected material formulations and their properties. According to the present embodiments, the spatial locations of the deposition of each material formulation with the layer is defined, either to effect occupation of different three-dimensional spatial locations by different material formulations, or to effect occupation of substantially the same three-dimensional location or adjacent three-dimensional locations by two or more different material formulations so as to allow post deposition spatial combination of the material formulations within the layer, thereby to form a composite material formulation at the respective location or locations.

Any post deposition combination or mix of modeling material formulations is contemplated. For example, once a certain material formulation is dispensed it may preserve its original properties. However, when it is dispensed simultaneously with another modeling material formulation or other dispensed material formulations which are dispensed at the same or nearby locations, a composite material formulation having a different property or properties to the dispensed material formulations is formed.

The present embodiments thus enable the deposition of a broad range of material formulation combinations, and the fabrication of an object which may consist of multiple different combinations of material formulations, in different parts of the object, according to the properties desired to characterize each part of the object.

Further details on the principles and operations of an AM system suitable for the present embodiments are found in U.S. Published Application No. 20100191360, the contents of which are hereby incorporated by reference.

Figure 1:
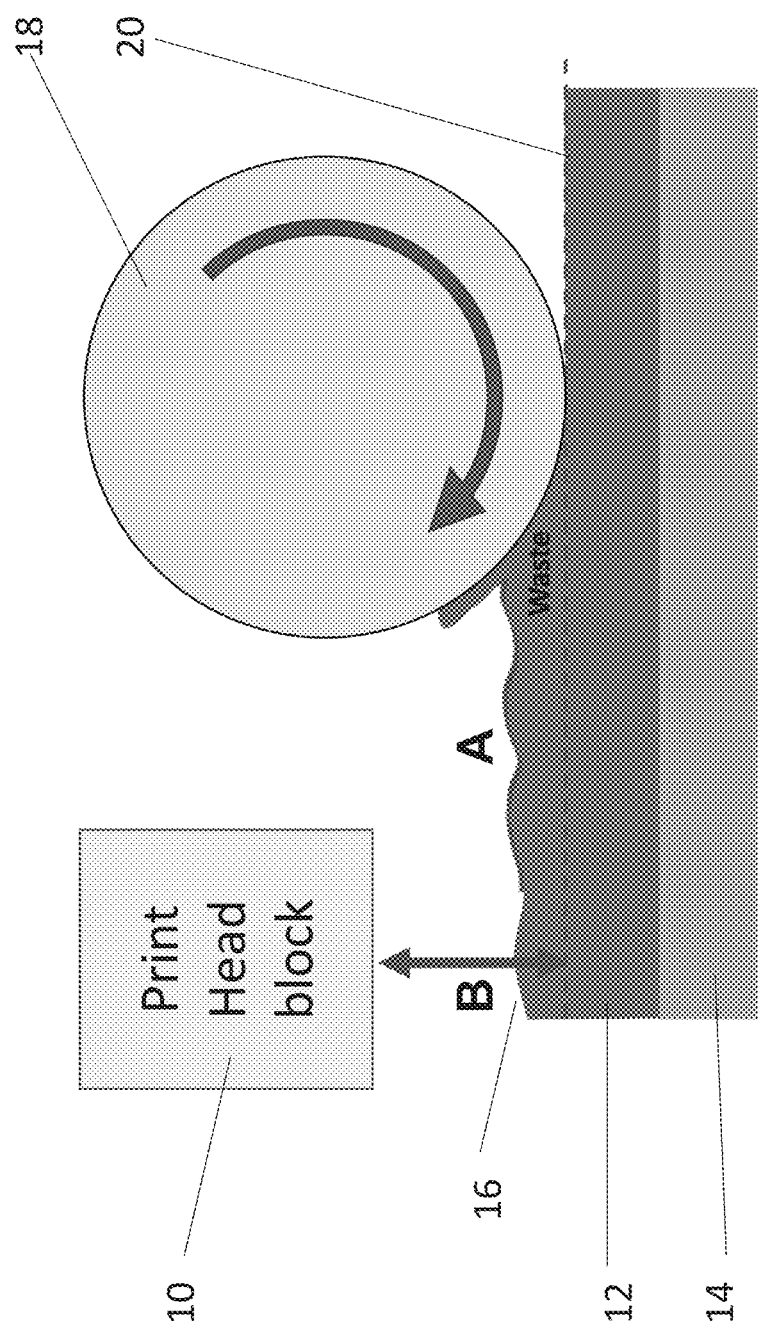

For purposes of better understanding some embodiments of the present invention, as illustrated in FIGS. 4A-13 of the drawings, reference is first made to the construction and operation of conventional roller-based flattening as illustrated in FIG. 1, and to issues arising therewith that have come to the attention of the present inventors, as shown in FIGS. 2A-2C and 3.

As illustrated in FIG. 1, print head block 10 deposits new layer 12 over previously deposited layer 14. Due to various factors which are discussed herein, the newly deposited layer has a relatively rough surface 16. In order to obtain a smooth surface and control layer thickness, roller 18 is used for leveling the newly deposited layer, thereby removing a portion of the material freshly deposited (see A). The result is a smooth surface 20 after the passage of the roller, but a substantial amount of material deposited for building layer 12 has been removed. Besides flattening the surface, the roller is used to remove a pre-determined amount of material to maintain a fixed distance between the print head block and each of the printed layers. Arrow B shows the fixed distance between the print head block and the intended layer surface (equivalent to surface 20) after the passage of roller 18.

Figure 2:
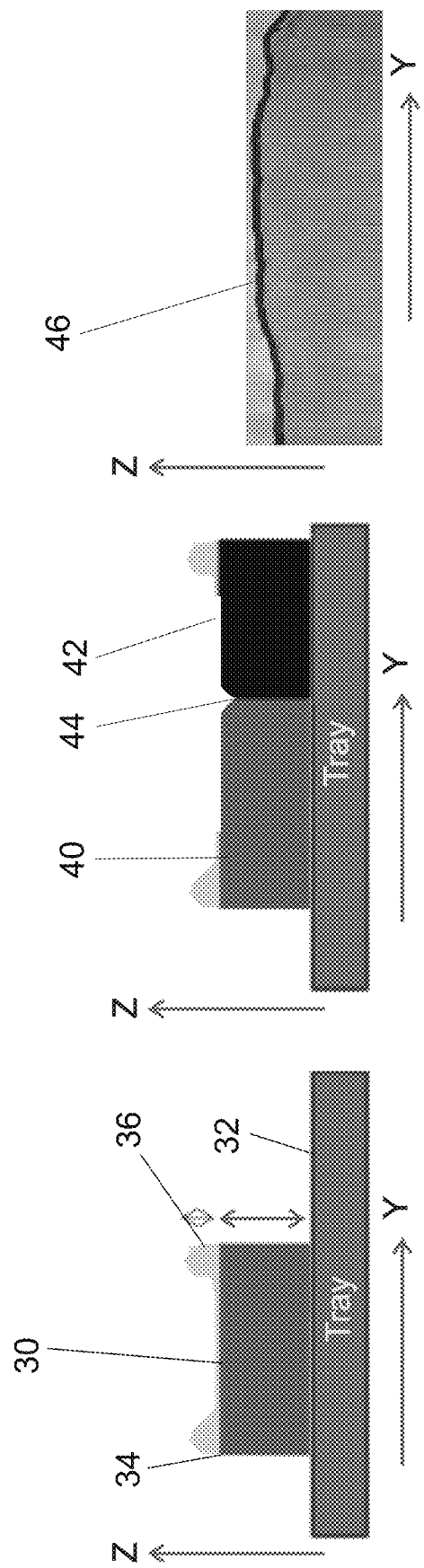

FIGS. 2A-2C illustrate some of the problems that may occur in inkjet additive manufacturing. FIG. 2A illustrates the issue of crosstalk. A model 30 is printed on tray 32. Material peaks at 34 and 36 cause distortion effects known as crosstalk, and when using a roller may cause knocking of the roller on the material peaks.

FIG. 2B illustrates two different materials 40 and 42 printed next to each other, for example a model material with a support material. A wetting interaction distorts the shape 44 at the junction between them.

FIG. 2C shows a side view of a block 46 formed by dispensing several layers of building material without indexing the dispensing head in the Y direction. An uneven surface can be seen, which may be due to one or more defects in the printing head, such as irregularities in nozzle size, distance accuracy between consecutive nozzles in the nozzle array, or differences in jetting power between the nozzles.

Figure 3:
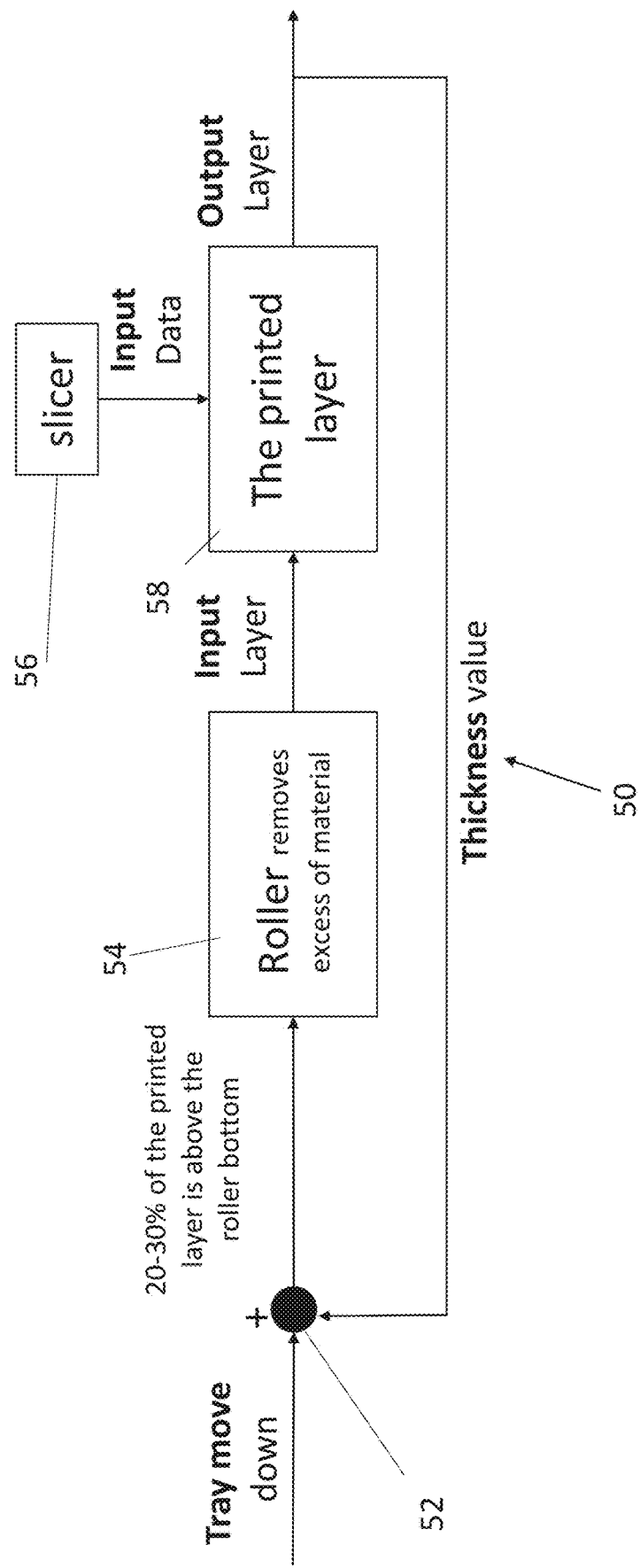

Reference is now made to FIG. 3, which is a block diagram of a 3D printer using a roller according to FIG. 1. The printing tray that holds the object being printed is moved down at the end of each layer by the width of the layer to be added, based on thickness value 50 (e.g. 30 μm). Roller 54 removes excess material from the newly printed layer (e.g. any material above the 30 μm pre-determined thickness), which may add up to 20-30% of the amount of material deposited. Then slicer data 56 is supplied as input to print a new layer 58, and the tray is moved down again and the new layer is leveled.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Pre-print data correction at the level of slicer bitmaps can handle effects that are predictable or partially predictable, such as cross talk, lack of uniformity between nozzle drop volumes of different nozzles, and so on, before the printing procedure commences.

Reference is now made to FIG. 4A, which is a simplified flow chart illustrating a method of providing a printed layer which is smooth or substantially smooth from the outset according to one embodiment of the present invention. The method involves a pre-printing or calibration stage 60 and a printing stage 62. Pre-printing stage 60 includes obtaining nozzle "weightings" corresponding to the "jetting power" of each individual nozzles of the print head. For this purpose, a digitized head profile may be obtained by printing an object (e.g. a wall) having a length of at least the length of the printhead array, said object being printed by depositing several layers of materials without using a leveling device (e.g. roller) and without moving the printhead in the Y direction. The whole object or a side/Y cross-section is then captured via a digital means (e.g. digital camera or digital scanner) to generate a digitized profile corresponding to the printing output of a specific print head (box 64). Then, the position of each individual nozzle of the print head is mapped on its digitized profile (box 66). Nozzles mapping is then used to give the nozzles individual weightings (box 68), which is related to the drop size produced by that nozzle.

Based on the weightings, a data correction filter (hereafter also referred as "DCF") is then generated (box 70) which increases operation (e.g. at the level of the slicer data) around thin parts of the profile, e.g. by addition of material, optionally by adding slices of material, where the printed surface is liable to be lower or less than the desired layer height, and decreases operation around thicker parts of the profile, e.g. by dilution where the printed surface is liable to be above the desired layer height, so as to provide a smoother layer surface at a consistent height. The DCF is in a sense an inverse function of the thickness profile.

Generation of the DCF is discussed in further detail in FIG. 4B below.

In printing stage 62, printing data is received from the slicer in the form of a 2D layer map that defines which pixel of the layer is "activated" (deposition of material at this specific (X,Y) coordinate), and which one is not. The 2D layer map received from the slicer is then modified using the DCF, and the modified print data is used to operate the print head during the printing of the layer, thereby obtaining a smooth layer with a minimal intervention of the leveling device (e.g. roller). In some specific embodiments of the invention, no leveling device is used. Thanks to the present invention, the roller has considerably less smoothing to do and far less material is removed, for instance between 0-20%, or between 1-10%, or less than 5% of the total amount of material deposited to form a specific layer. In specific embodiments, no roller is needed at all.

The nozzle weightings and the DCF may relate to individual drop sizes from given nozzles. The position weightings, which corresponds for instance to a specific position on the data provided to print a specific slide, e.g. a pixel on a 2D map, may take into account the nozzle weightings of the nearby nozzles that influence the given position, the strength of the jet from the individual nozzle above said given position, and optionally any further irregularities related to nozzle positioning on the print head.

The print data comprises instructions for activating or inactivating nozzles over the course of print head scanning for printing a layer or part of a layer, and the DCF modifies the operation of individual nozzles, typically by providing a multiplier to the given nozzle. As shown above, nozzles individual weighting may be obtained based on measurements made on a test or calibration layer.

Figure 4B:
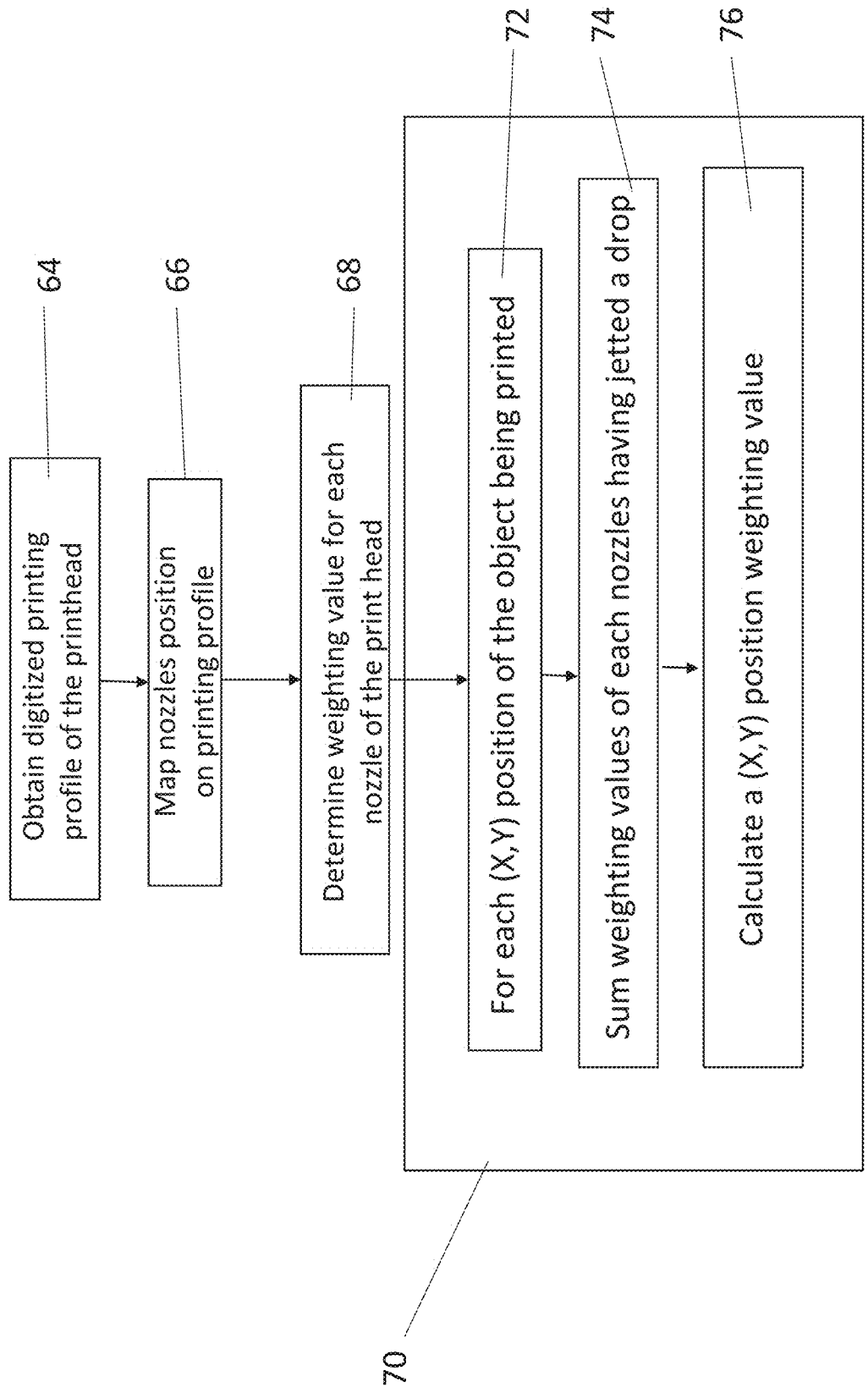

Reference is now made to FIG. 4B, which shows a method for generation of the DCF in greater detail. As shown in FIG. 4A, a digitized head profile is obtained (box 64), the position of each individual nozzle of the print head is mapped (box 66), and individual weighting is attributed to each one of the nozzles (box 68). Nozzles mapping is then used to give the nozzles individual weightings 68, which may correspond to the drop size produced by that nozzle.

During the printing process, for each (X,Y) position or coordinate of the object being printed (box 72), the overall thickness is calculated by summing up the respective weightings of the jetting nozzles that have printed the previous slices at the same (X,Y) position (box 74). A thickness value at said (X,Y) position (or "position weighting") is obtained (box 76). If taken together, the position weightings at each (X,Y) position form a height map as exemplified in FIG. 10. This height map is generally different on a per layer basis, since the position weighting values will be higher if more layers have been printed.

Reference is now made to FIG. 5, which illustrates a further embodiment of the invention in which the printing process can rely on a real-time feedback loop, the thickness data being provided by one or more sensors installed in the printing system. This embodiment may be used independently from the embodiment described in FIG. 4A, in which case an initial DCF is obtained from a first scanned printed layer.

In FIG. 5, an earlier layer (Z=n−1) is printed (box 80). This layer is scanned after printing to obtain an actual thickness profile, gathering data for each (X,Y) position of the layer (box 82). The actual thickness is then used to ensure that the distance between the print head(s) and the new layer to be printed is kept constant. If the distance is not appropriate, the Z-height of the tray (or of the print head/printing block) may be corrected (box 84). The actual thickness may also be used to modify the DCF (box 86), so that the DCF may take into account dynamic changes occurring during the course of printing, for instance a nozzle becoming blocked. Finally, a new layer is printed (Z=n) (box 88).

As discussed above, the DCF may be a function that operates on incoming print data to increase densities of operational nozzles in thin parts of the layer profile and decreases densities of operational nozzles in thick parts of the profile.

The scan may be carried out using a laser scanner, or any other measurement device that may quickly and conveniently provide a thickness profile for the layer.

Figure 6:
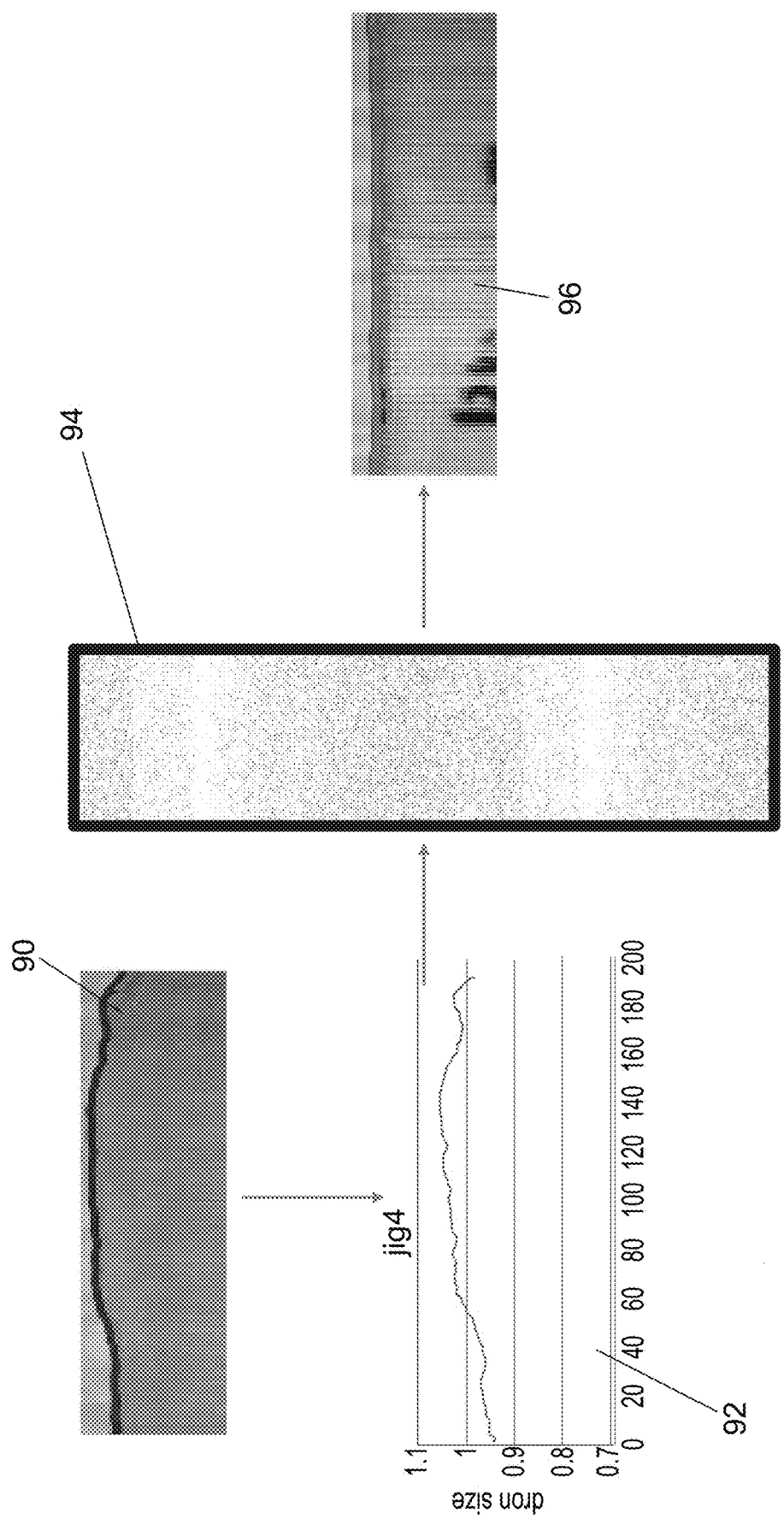

Reference is now made to FIG. 6, which illustrates various stages of the process of FIG. 4A using images obtained from a test operation. Several layers are printed to form a bar or wall in order to obtain a thickness profile of the print head. Head profile 90, which is a Z/Y side view of the printed bar, shows variations of height due to difference in the amount of material deposited by each one of the head nozzles.

The profile is then digitized and may be used to produce graph 92. Based on graph 92, weightings can be assigned to the different nozzles of the nozzle head. The nozzle weightings can for example be estimates of the drop size or amount of material jetted by the nozzle. The nozzle weighting value can be further modified based on known irregularities of the nozzle layout and the like, or one can consider that these irregularities are taken into account in the nozzle weighting value.

A data dilution plan or Data Correction Filter (DCF) 94 is then prepared which is in a sense the negative or inverse function of the thickness profile. When applied to incoming print data (e.g. 2D layer map provided by the slicing software), applying the DCF before printing the layer helped obtaining a smooth profile as shown in 96. It is apparent from the picture that the profile is not 100% smooth and still has some bumps and hollows, but profile 96 is nevertheless far smoother than profile 90 generated without correction. Then, a leveling device may be applied to remove between 0-20% of the material a further smooth the layer.

The pre-print data correction when used alone may reduce phenomena relating to material placement but relies on a forecast of all phenomena that may occur. The use of real time correction during printing adds feedback on the distance from the print head, as well as feedback on missing or bad nozzles. However, the real-time correction requires scanning, which can decrease throughput, and therefore in embodiments, the real-time correction is preferably applied at preset intervals and not at every layer. A real-time correction requires the addition of a module that can scan the entire printed surface of an object.

A second or additional approach to data correction involves data correction while i.e. during the course of printing, e.g. by using a sensor. Use of a sensor enables to manipulate the printed data as a function of real printing results, depending on the type of sensor used. For example, a 1D sensor can be used to monitor the distance of the orifice plate on which the nozzles are mounted, from the printing surface, A 2D sensor may monitor variations in height of a wall formed during printing, The variation in wall height provides real-time feedback about the surface of a model being printed, such as a virtual height map of the printed model, e.g. based on the data obtained regarding which nozzle is depositing material and where, as well as the drop volume of each nozzle. A 3D sensor would monitor surface height variation of the entire printed surface of the object being printed.

Optionally, a combination of pre-print data correction and data correction during printing may be employed.

Figure 7:
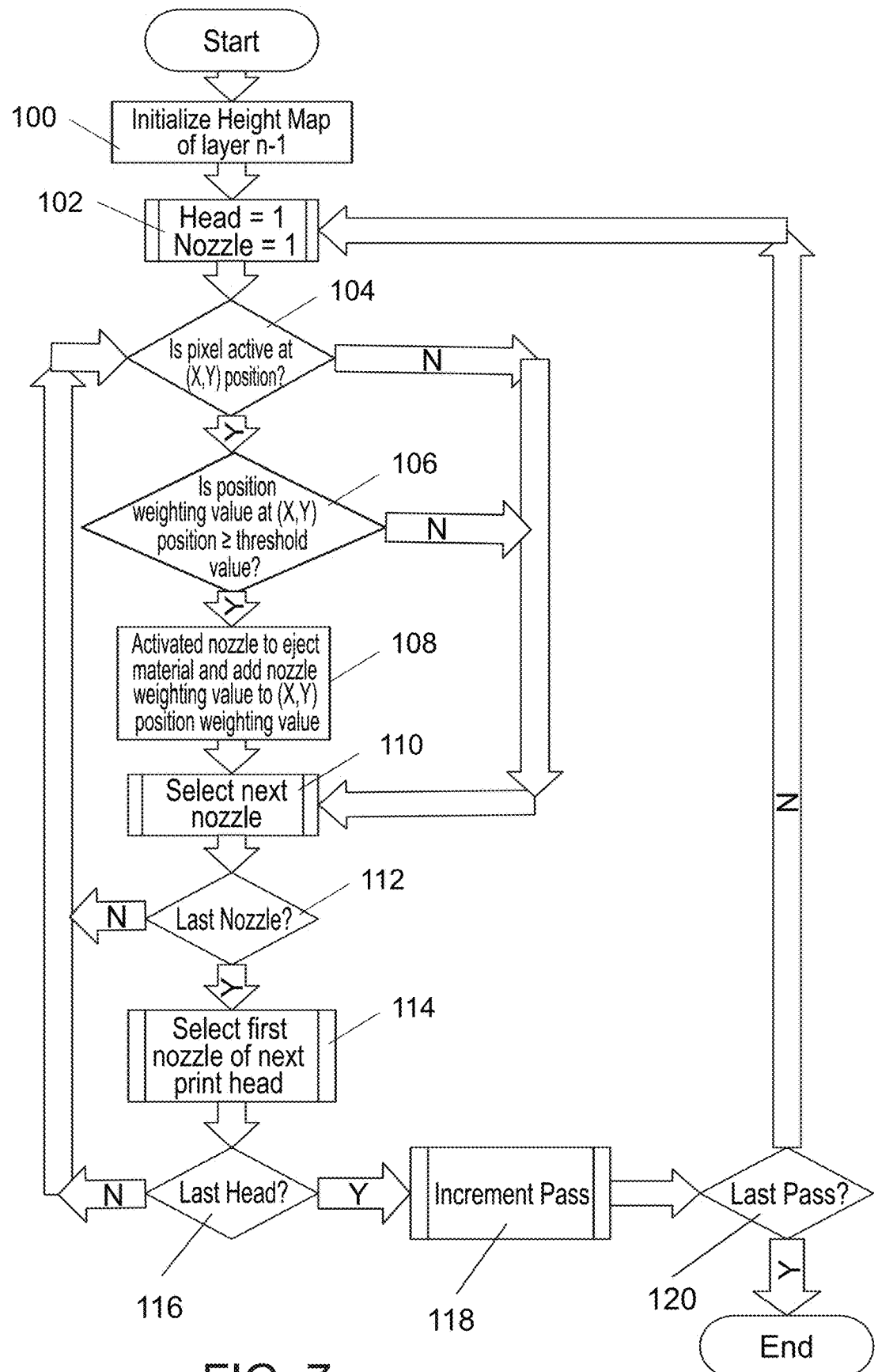

Reference is now made to FIG. 7, which is a simplified flow chart illustrating an embodiment of the printing process of the invention. The printing system calculates or provide a height map (or tray map) previously stored, which represents accumulated data of the previously printed layers (see FIG. 4B). The Height Map of layer n−1 is initialized before printing new layer n (box 100). For each scanning position of the head, a test is performed for each one of its nozzles to determine whether material should be jetted by the nozzle or not. In the present example, nozzle 1 of head 1 is located at a (X,Y) position (corresponding to a specific pixel of a 2D layer map or slice) and is being tested (box 102). First, the 2D layer map corresponding to layer n is interrogated to determine whether the pixel at (X,Y) position is "active" or not, i.e. whether material is planned to be deposited or not at this location according to the 2D layer map provided by the slicer (box 104). If the pixel has been set as "active", then the (X,Y) position is tested to determine whether the position weighting value at this location of the height map is above or below a pre-determined threshold (box 106). This threshold value may typically be related to the number of drops that have been deposited at this location and the theoretical thickness provided by each individual drop. If the position weighting is equal or below to the pre-determined threshold value, the nozzle is activated, a drop of material is deposited at location (X,Y), and the nozzle weighting value is added at the (X,Y) location position weighting value of the height map (box 108). The next nozzle of the head is selected (box 110) and testing is repeated until all the nozzles/positions have been checked. At box 112 the loop checks for the last nozzle. If the tested nozzle was not the last nozzle of the head, then the loop is repeated and if not then the next print head is selected (box 114) and the process is repeated for the following head, unless this is detected to be the final head (box 116) in which case the pass number is incremented (box 118). Box 120 checks if the pass number is the last pass and if so the process is ended.

Figure 8:
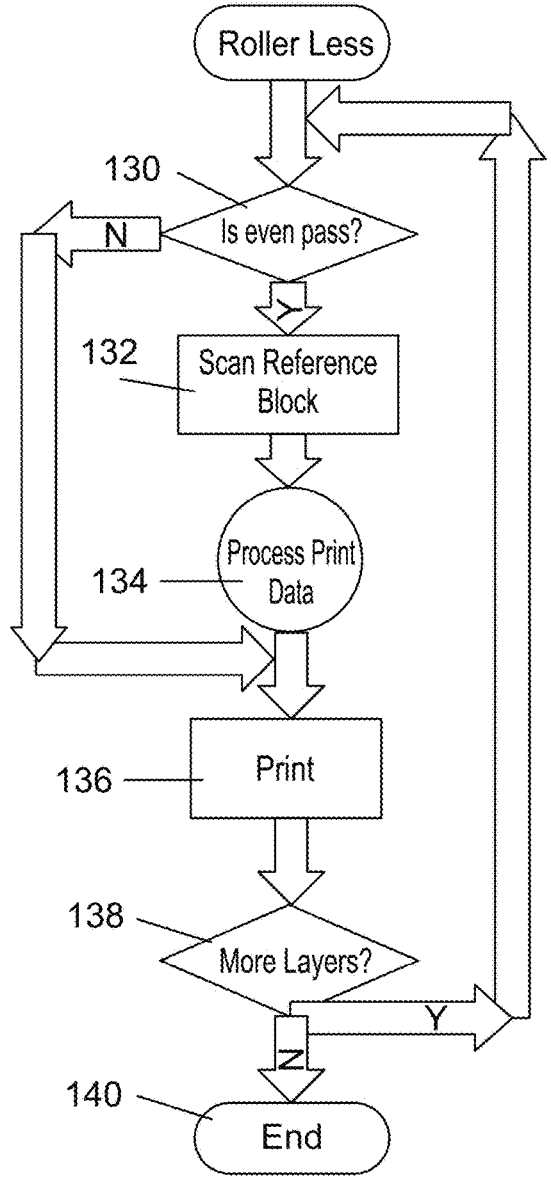

Reference is now made to FIG. 8, which is a simplified flow chart showing an embodiment in which the calibrations, here denoted the scan reference block, are used to print a subsequent layer. The process distinguishes between odd and even passes in 130. In even passes at 132 the scan reference block is consulted and the nozzle is modified according to the calibration during processing of print data in 134. In 136 the layer is printed and in 138 the process loops round for the next layer or exits to 140.

Figure 9:
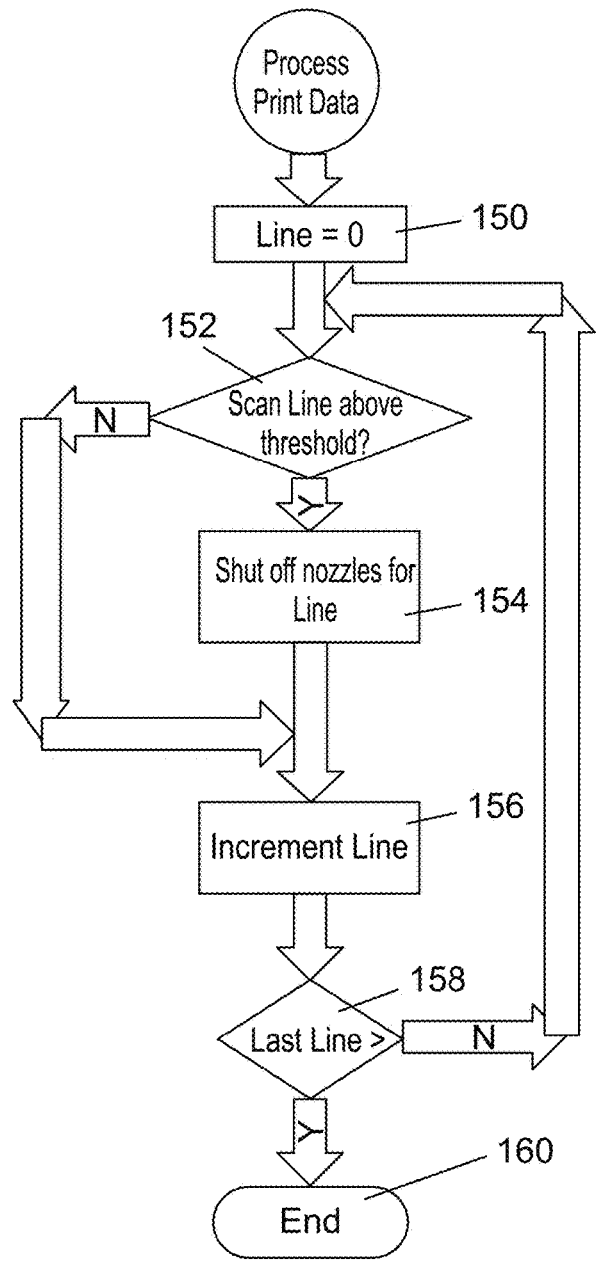

Reference is now made to FIG. 9, which is a simplified flow diagram showing how the real-time corrections may be carried out. The print data is obtained in 148 and the scan is initiated with line 0 in 150. At 152 the line is scanned to see if it is above threshold or not. If the scan is above threshold then in 154 the nozzles for the line are switched off. Otherwise printing proceeds accordingly. In 156 the line is incremented and the process loops until the final line is identified in 158 and the process exits at 160.

Figure 10:
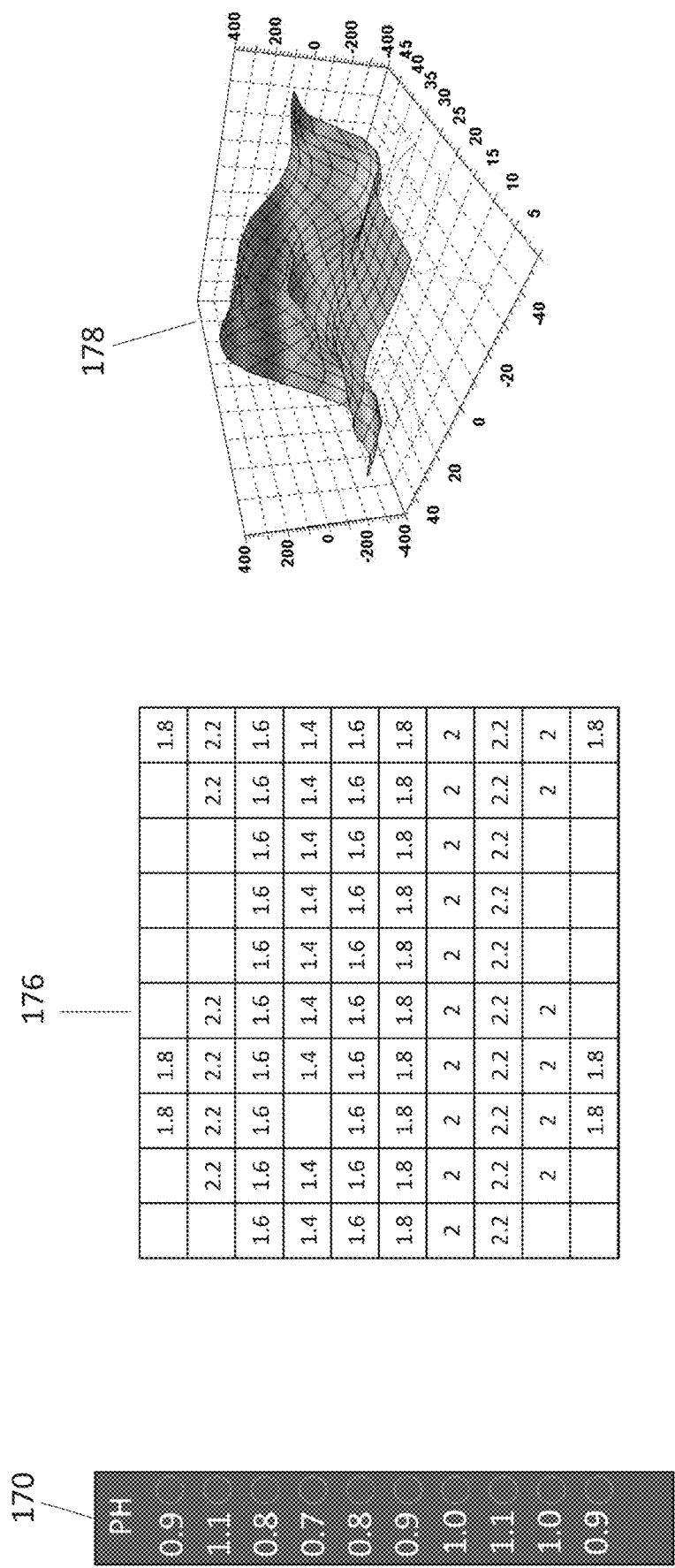

Reference is now made to FIG. 10 which shows a print heads PH-1 170 having a linear array of ten nozzles. Weightings are assigned to each of the nozzles, for instance, based on the data extracted from a digitized head profile (see FIG. 4A). A height map 176 can be built during the printing process, in which cumulative position weightings information is stored. Each square of the height map represents a specific (X,Y) coordinate. When a value appears in a specific square, it means that at least one drop of material has been deposited at this location when printing at least one of the preceding layers (i.e. the pixel has been defined as "active" in at least one of the 2D layer map/slice). When no value appears in the square, it means that no material has been printed at this location so far. Each time a drop is jetted by a specific nozzle at a specific position, the nozzle weighting is added to the existing value in the corresponding location of the height map. In the present case, height map 176 represents two scans of print head 170. Another possible representation of the height map as used in the present invention is shown in 178.

Reference is now made to FIG. 11, which is a block diagram showing a printing process which includes a pre-printing calibration step according to some embodiments of the invention. Pre-print data includes print heads nozzles weighting information 180 as shown in FIG. 10, and may also include other information/data relating to known printing phenomena 182, such as elevated contours (see FIG.

2A), wetting interaction between resins (see FIG. 2B), thin wall, and any other predictable phenomenon related to the geometry of the object to be printed. Print data from slicing 184, typically a 2D layer map, (e.g. BMP) is then combined with the pre-print data to form a correction algorithm filter 186 to be applied to the layer being printed 188. Finally, a subsequent layer 190 is printed.

Reference is now made to FIG. 12, which is a simplified block diagram showing real-time correction according to some embodiments of the invention. Sensor 200 measures the actual thickness of a printed layer (output layer) and a comparator compares the result with print—or slice—data from slicer 184. Data correction algorithm filter 202 carries out a transformation of the print data based on the measured errors so that the printed layer 188 is smoothed. Movement of the tray is performed and a subsequent layer 190 may be printed.

Reference is now made to FIG. 13, which is a simplified block diagram showing a combination of the embodiments shown of FIGS. 11 and 12 in which both pre-printing calibration and real-time correction are carried out in the same printing process. Pre-print data is prepared from nozzle weighting distribution information 180 as discussed in FIG. 10, and may also include other information/data relating to known printing phenomena 182, such as elevated contours (see FIG. 2A), wetting interaction between resins (see FIG. 2B), thin wall, and any other predictable phenomenon related to the geometry of the object to be printed. Print data from slicing 184, typically a 2D layer map (e.g. BMP) is then combined with the pre-print data to form a first data correction filter (DCF 1) 186. Data from the first data correction filter 186 is then combined with the information providing from real-time measurements of the layer thickness and/or a map of distances between the printing block and printed layer, provided by one or more sensors 200, to form a second data correction filter (DCF 2) 202 which is provided to the layer being printed. Typically, sensor 200 may include a proximity sensor, a CCD or linear CCD camera, and/or an accelerometer included in the roller to measure "bump" events. Sensor 200 may be used to measure the actual thickness of a printed layer and a comparator compares the result with the output of the first data correction algorithm filter 186. Data correction algorithm filter 202 carries out a transformation of the print data based on the measured errors so that the printed layer 188 is printed more smoothly. Movement of the tray is performed and a subsequent layer 190 may be printed.

In some embodiments of the invention, nozzle scattering (movement of the printhead in Y direction) is made between layers so as to minimize the impact of missing nozzles. In that case, the movement of the printhead is recorded in order to clearly register the new Y positioning of each one of the nozzles. This data will be taken into account when updating the height map according to the nozzle weighting values of the new printed layer.

It is expected that during the life of a patent maturing from this application many relevant additive manufacturing and scanning technologies will be developed and the scopes of the corresponding terms are intended to include all such new technologies a priori.

The terms "comprises", "comprising", "includes", "including", "having" and their conjugates mean "including but not limited to".

The term "consisting of" means "including and limited to".

As used herein, the singular form "a", "an" and "the" include plural references unless the context clearly dictates otherwise.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A method of additive manufacturing a three-dimensional object by layerwise deposition of a building material with an inkjet printing system comprising a print head and a building tray, the printhead comprising a plurality of nozzles, said method comprising:

calculating a weighting value for each nozzle of said printhead, said weighting value corresponding to an amount of material being dispensed by each of said nozzles;

for each layer of the object being printed:
  i. obtaining a two-dimensional map of the layer, said two-dimensional map comprising active pixels at (X,Y) positions where building material should be dispensed;
  ii. obtaining a first Data Correction Filter (DCF1) including a height map of the previous layer which comprises a series of (X,Y) position weighting values, each position weighting value being based on nozzle weighting values and representing the amount of material that has been cumulatively dispensed at each said (X,Y) position in the preceding layers;
  iii. obtaining a second Data Correction Filter (DCF2) including a thickness map and/or a proximity map of the previous layer; said map(s) being constructed from data obtained from one or more sensors that have scanned said previous layer;
  iv. comparing the data of the two-dimensional map to the data provided by DCF1 and DCF2 per each (X,Y) position and determining whether a nozzle should be activated at said (X,Y) position to dispense an amount of material;

v. printing the layer based on the data obtained in (iv);

vi. updating the position weighting values of the height map of DCF1; and vii. adjusting the position of the print head vis a vis the printing tray;

repeating steps (i) to (vii) above until the three-dimensional object is printed.

2. The method of claim 1, wherein the weighting value for each nozzle of the printhead is calculated by: (a) pre-printing an object with a Y length of at least the length of the printhead, said object comprising a plurality of layers so that a print head printing profile can be observed; (b) digitizing said pre-printed object and mapping each one the print head nozzles to said profile; and (c) attributing the weighting value to each nozzle based on said digitized printing profile.

3. The method of claim 1, wherein the two-dimensional map of the layer of step (i) is provided by a slicer software.

4. The method of claim 1, wherein the DCF1 of step (ii) is stored in a computer memory.

5. The method of claim 1, wherein the DCF1 further includes compensation data related to known printing phenomena and/or to the geometry of the three-dimensional object being printed.

6. The method of claim 1, wherein step (vi) is performed by adding to each (X,Y) position wherein a nozzle has been activated, the weighting value of said nozzle so that the (X,Y) position weighting value is updated.

7. The method of claim 1, further comprising scanning the printed layer with a sensor and modulating the DCF1 of the next layer with the data collected by said sensor.

8. The method of claim 7, wherein said sensor is a CCD camera or a linear CCD camera.

9. The method of claim 7, wherein said sensor is a proximity sensor.

10. The method of claim 1, further comprising smoothing one or more printed layers with a leveling device selected from a planarizer, a roller and a scraper.

11. The method of claim 10, wherein said leveling device removes less than 5-10% of the amount of material deposited in said layer.

* * * * *